United States Patent
Boardman et al.

(10) Patent No.: US 9,641,026 B2
(45) Date of Patent: May 2, 2017

(54) ENHANCED COMMUNICATION INFRASTRUCTURE FOR HIERARCHICAL INTELLIGENT POWER DISTRIBUTION GRID

(75) Inventors: Ethan Clair Boardman, Seattle, WA (US); Sumit Roy, Bothell, WA (US); Subrahmanyam Saraswati Venkata, Oro Valley, AZ (US)

(73) Assignee: ALSTOM TECHNOLOGY LTD., Baden (CH)

( * ) Notice: Subject to any disclaimer, the term of this patent is extended or adjusted under 35 U.S.C. 154(b) by 0 days.

(21) Appl. No.: 13/155,707

(22) Filed: Jun. 8, 2011

(65) Prior Publication Data

US 2012/0316689 A1 Dec. 13, 2012

(51) Int. Cl.
  *G06F 1/26* (2006.01)
  *H02J 13/00* (2006.01)
(52) U.S. Cl.
  CPC ............................... *H02J 13/0079* (2013.01)
(58) Field of Classification Search
  CPC .................................................... H04Q 3/0008
  USPC ......................................... 700/286; 340/2.71
  See application file for complete search history.

(56) References Cited

U.S. PATENT DOCUMENTS

| | | |
|---|---|---|
| 3,944,723 A | 3/1976 | Fong |
| 4,689,735 A | 8/1987 | Young |
| 6,347,027 B1 | 2/2002 | Nelson et al. |
| 6,434,512 B1 | 8/2002 | Discenzo |
| 6,697,240 B2 | 2/2004 | Nelson et al. |
| 7,289,887 B2 * | 10/2007 | Rodgers ........................ 700/295 |
| 7,398,194 B2 | 7/2008 | Evans et al. |
| 7,724,778 B2 * | 5/2010 | Ying .............................. 370/489 |
| 7,747,739 B2 | 6/2010 | Bridges et al. |

(Continued)

OTHER PUBLICATIONS

Bose, Anjan. New Smart Grid Applications for Power System Operations. IEEE Power and Energy Society General Meeting, 2010 IEEE. Jul. 25-29, 2010. pp. 1-5.*

(Continued)

*Primary Examiner* — Mohammad Ali
*Assistant Examiner* — Emilio J Saavedra
(74) *Attorney, Agent, or Firm* — Amin, Turocy & Watson, LLP

(57) ABSTRACT

The subject specification comprises enhanced communication infrastructure for a multi-tier hierarchical smart distribution grid (SDG). The SDG comprises a specified number of distribution network node controller (DNNC) components employed to desirably control communications and power distribution between respective tiers of the SDG to facilitate efficient power distribution. When communication between the a DNNC in one tier and another DNNC in another tier, is desired, the DNNC can identify available communication channels and respective communication conditions of the available communication channels, and can dynamically select a subset of available data and preferred communication channel, based at least in part on predefined control criteria, to control data transmission loads in the network and facilitate real time control of the SDG. Data can be communicated via the selected communication channel. Respective DNNCs can desirably control power distribution for respective tiers, minimizing upper tier involvement in lower tier power distribution.

20 Claims, 13 Drawing Sheets

(56) References Cited

U.S. PATENT DOCUMENTS

| | | | |
|---|---|---|---|
| 7,844,370 B2 | 11/2010 | Pollack et al. | |
| 8,335,595 B2 | 12/2012 | Tolnar et al. | |
| 8,350,412 B2 | 1/2013 | Massie et al. | |
| 8,401,709 B2 | 3/2013 | Cherian et al. | |
| 8,417,391 B1 | 4/2013 | Rombouts et al. | |
| 8,447,434 B1 | 5/2013 | Harris et al. | |
| 8,525,522 B2 | 9/2013 | Gong et al. | |
| 8,558,551 B2 | 10/2013 | Mynam et al. | |
| 8,588,991 B1 | 11/2013 | Forbes, Jr. | |
| 8,730,837 B2 | 5/2014 | Popescu et al. | |
| 8,781,640 B1* | 7/2014 | Miller | H02J 4/00 700/286 |
| 8,924,033 B2 | 12/2014 | Goutard et al. | |
| 2002/0064010 A1 | 5/2002 | Nelson et al. | |
| 2003/0055677 A1 | 3/2003 | Brown et al. | |
| 2004/0081193 A1 | 4/2004 | Forest et al. | |
| 2004/0125753 A1* | 7/2004 | Mahany | H04L 1/0002 370/254 |
| 2005/0005093 A1 | 1/2005 | Bartels et al. | |
| 2005/0039040 A1* | 2/2005 | Ransom et al. | 713/200 |
| 2005/0125104 A1 | 6/2005 | Wilson et al. | |
| 2006/0195229 A1* | 8/2006 | Bell et al. | 700/286 |
| 2007/0005315 A1 | 1/2007 | Evans et al. | |
| 2007/0018334 A1* | 1/2007 | Peytavy | G06F 21/86 257/778 |
| 2007/0087756 A1 | 4/2007 | Hoffberg | |
| 2007/0124026 A1 | 5/2007 | Troxell et al. | |
| 2007/0206644 A1 | 9/2007 | Bertsch et al. | |
| 2007/0239373 A1 | 10/2007 | Nasle | |
| 2007/0285079 A1 | 12/2007 | Nasle | |
| 2008/0109205 A1 | 5/2008 | Nasle | |
| 2008/0272934 A1* | 11/2008 | Wang et al. | 340/870.11 |
| 2009/0066317 A1* | 3/2009 | de Buda | H04B 3/56 324/103 R |
| 2009/0129376 A1 | 5/2009 | Johnson | |
| 2009/0228324 A1 | 9/2009 | Ambrosio et al. | |
| 2009/0254655 A1 | 10/2009 | Kidwell et al. | |
| 2009/0281673 A1 | 11/2009 | Taft | |
| 2009/0281674 A1* | 11/2009 | Taft | 700/286 |
| 2009/0281679 A1 | 11/2009 | Taft et al. | |
| 2009/0299542 A1* | 12/2009 | Nuqui et al. | 700/297 |
| 2009/0319093 A1 | 12/2009 | Joos et al. | |
| 2010/0017214 A1 | 1/2010 | Ambrosio et al. | |
| 2010/0070089 A1 | 3/2010 | Harrod et al. | |
| 2010/0138363 A1 | 6/2010 | Batterberry et al. | |
| 2010/0152910 A1 | 6/2010 | Taft | |
| 2010/0177450 A1 | 7/2010 | Holcomb et al. | |
| 2010/0179704 A1 | 7/2010 | Ozog | |
| 2010/0241560 A1* | 9/2010 | Landau-Holdsworth et al. | 705/39 |
| 2010/0286840 A1 | 11/2010 | Powell et al. | |
| 2010/0317420 A1 | 12/2010 | Hoffberg | |
| 2010/0324844 A1 | 12/2010 | Marti | |
| 2011/0004446 A1 | 1/2011 | Dorn et al. | |
| 2011/0004513 A1 | 1/2011 | Hoffberg | |
| 2011/0035073 A1 | 2/2011 | Ozog | |
| 2011/0063126 A1* | 3/2011 | Kennedy et al. | 340/870.02 |
| 2011/0071695 A1 | 3/2011 | Kouroussis et al. | |
| 2011/0074436 A1 | 3/2011 | Nowicki et al. | |
| 2011/0093127 A1 | 4/2011 | Kaplan | |
| 2011/0106321 A1* | 5/2011 | Cherian et al. | 700/286 |
| 2011/0109266 A1* | 5/2011 | Rossi | 320/109 |
| 2011/0172838 A1 | 7/2011 | Pai et al. | |
| 2011/0208366 A1 | 8/2011 | Taft | |
| 2011/0221393 A1* | 9/2011 | Billmaier | 320/109 |
| 2011/0231028 A1 | 9/2011 | Ozog | |
| 2011/0282508 A1 | 11/2011 | Goutard et al. | |
| 2011/0288692 A1 | 11/2011 | Scott | |
| 2011/0313581 A1 | 12/2011 | Genc et al. | |
| 2011/0313586 A1 | 12/2011 | Popescu et al. | |
| 2012/0029710 A1 | 2/2012 | Dodderi et al. | |
| 2012/0029720 A1 | 2/2012 | Cherian et al. | |
| 2012/0126994 A1* | 5/2012 | Sobotka et al. | 340/870.02 |
| 2012/0175951 A1 | 7/2012 | Pamulaparthy et al. | |
| 2012/0179301 A1 | 7/2012 | Aivaliotis et al. | |
| 2012/0181869 A1 | 7/2012 | Chapel et al. | |
| 2012/0229082 A1* | 9/2012 | Vukojevic et al. | 320/108 |
| 2012/0253540 A1 | 10/2012 | Coyne et al. | |
| 2012/0277926 A1 | 11/2012 | Nielsen et al. | |
| 2012/0310423 A1 | 12/2012 | Taft | |
| 2012/0310434 A1 | 12/2012 | Taft | |
| 2012/0316689 A1 | 12/2012 | Boardman et al. | |
| 2012/0316691 A1 | 12/2012 | Boardman et al. | |
| 2012/0316696 A1 | 12/2012 | Boardman et al. | |
| 2012/0316697 A1 | 12/2012 | Boardman et al. | |
| 2013/0035802 A1 | 2/2013 | Khaitan et al. | |
| 2013/0036311 A1 | 2/2013 | Akyol et al. | |
| 2013/0099565 A1 | 4/2013 | Sachs et al. | |
| 2013/0113291 A1 | 5/2013 | Recker et al. | |
| 2014/0091622 A1 | 4/2014 | Lucas et al. | |
| 2015/0002186 A1 | 1/2015 | Taft | |

OTHER PUBLICATIONS

Bose, Anjan., "Smart Transmission Grid Applications and their supporting Infrastructure" IEEE Transactions on Smart Grid vol. 1, No. 1 Jun. 2010, pp. 11-19.*

Budka et. al., "Communication Network Architecture and Design Principles for Smart Grids", Journal Bell Labs Technical Journal—Green Information and Communications Technology (ICT) for Eco-Sustainability archive vol. 15 Issue 2, Aug. 2010 pp. 205-227.*

Li et. al.,"Smart Transmission Grid: Vision and Framework" IEEE Transactions on Smart Grid, vol. 1 Issue 2, Sep. 2010 pp. 168-177.*

Kempton et al., "Vehicle-to-grid power fundamentals: Calculating capacity and net revenue" Journal of Power Sources vol. 144 2005. pp. 268-279.*

Brown et al., "Electric vehicles: The role and importance of standards in an emerging market" Energy Policy vol. 38, 2010 pp. 3797-3806.*

Hauser et al., "A Failure to Communicate: Next-Generation Communication Requirements, Technologies, and Architecture for the Electric Power Grid" IEEE Power & Energy Magazine. Mar./Apr. 2005, pp. 47-55.*

Smith, "2009 San Diego Symposium on Microgrids. Overview of the U.S. Department of Energy's Research & Development Activities on Microgrid Technologies" US Department of Energy Office of Electricity Delivery and Energy Reliability, Sep. 17, 2009, 21 pages.*

Del Carpio Huayllas et al., "Microgrid Systems: Current Status and Challenges" 2010 IEEE/PES Transmission and Distribution Conference and Exposition: Latin America, Nov. 8-10, 2010 , pp. 7-12.*

SCADA (Supervisory Control and Data Acquisition). http://en.wikipedia.org/wiki/SCADA, 10 pages.

IEC 61850. http://en.wikipedia.org/wiki/IEC_61850, 4 pages.

"Electric Power Transmission". http://en.wikipedia.org/wiki/Electricity_transmission. Last accessed Dec. 30, 2010, 16 pages.

"Electric Power Distribution". http://en.wikipedia.org/wiki/Electric_power_distribution. Last accessed Dec. 30, 2010, 6 pages.

"Power System Automation". http://en.wikipedia.org/wiki/Power_system_automation. Last accessed Dec. 30, 2010, 4 pages.

"Smart Grid". http://en.wikipedia.org/wiki/Smart_power_grid. Last accessed Dec. 30, 2010, 16 pages.

"Transformer" http://en.wikipedia.org/wiki/Transformer. Last accessed Dec. 30, 2010, 23 pages.

"Demand Response". http://en.wikipedia.org/wiki/Demand_response. Last accessed Dec. 30, 2010, 10 pages.

"Distributed Generation" . http://en.wikipedia.org/wiki/Distributed_generation. Last accessed Dec. 30, 2010, 5 pages.

Zimmer, et al. "Fault Tolerant Network Routing through Software Overlays for Intelligent Power Grids", 2010, Proceedings of the 2010 I EEE 16th international Conference on Parallel and Distributed Systems, ICPADS '10. 2010, 8 pages.

Motorola "Bringing Self-Awareness to the Grid, SCADA Systems Enhance Electric Utility Operations", 2009, Retrieved from the Internet on Jun. 12, 2013 at "www.motorola.com/ace3600", 4 pages.

(56) References Cited

OTHER PUBLICATIONS

Spack, et al. "Intelligent Transformer Substations in Modern Medium Voltage Networks as Part of Smart Grid", Nov. 2011, IEEE Sccion El Salvador, 7 pages.
Zhabelova, et al. "Multi-Agent Smart Grid Automation Architecture Based on IEC 61850/61499 Intelligent Logical Nodes", 2011, IEEE Transactions on Industrial Electronics, 10 pages.
Office Action dated Jan. 16, 2014 for U.S. Appl. No. 13/155,594, 38 pages.
Office Action dated Jan. 10, 2014 for U.S. Appl. No. 13/155,601, 24 pages.
Office Action dated Apr. 10, 2014 for U.S. Appl. No. 13/155,751, 47 pages.
Office Action dated Apr. 21, 2014 for U.S. Appl. No. 13/105,393, 46 pages.
Office Action dated May 8, 2014 for U.S. Appl. No. 13/155,594, 40 pages.
Office Action dated Jun. 9, 2014 for U.S. Appl. No. 13/155,615, 30 pages.
Higgins et al. "Distributed Power System Automation With IEC 61850, IEC 61499, and Intelligent Control", IEEE Transactions on Systems, Man, and Cybernetics—Part C: Applications and Reviews, vol. 41, No. 1, Jan. 2011, pp. 81-92.
Office Action dated Jun. 19, 2014 for U.S. Appl. No. 13/155,601, 30 pages.
Goldsman, et al. "Smart Dust: U Large-Scale, Low-Power, Flexible Sensor Networks", Feb. 2004, Dept of Electrical and Computer Engineering, University of Maryland, 40 pages.
Nikravesh, et al. "Control of Nonlinear Systems via Dynamic Neural Network Control (DNNC): Adaptive Control, Constraint Handling and Extension to MIMO Case", Mar. 1995, University of South Carolina and University of California, Berkeley, 5 pages.
Office Action dated Aug. 28, 2014 for U.S. Appl. No. 13/155,594, 49 pages.
European Search Report dated Oct. 16, 2014 for European Patent Application No. 12170004.1-1806/2533396, 5 pages.
Office Action dated Oct. 3, 2014 for U.S. Appl. No. 13/155,751, 57 pages.
European Office Action dated Jul. 10, 2015 for European Application No. 12170004.1, 3 pages.
Non-Final Office Action dated Jun. 18, 2015 for U.S. Appl. No. 13/155,601, 30 pages.
Office Action dated Apr. 7, 2015 for U.S. Appl. No. 13/155,751, 60 pages.
Office Action dated Apr. 7, 2015 for U.S. Appl. No. 13/155,594, 52 pages.
Pong et al., "A laboratory setup of a power transmission line system scaled model for testing and validation of sensor network applications," Technical Report TR-2010-002, Department of Electrical and Electronic Engineering, The University of Hong Kong, Apr. 2010. [Online]. Available: http://www.eee.hku.hk/research/technical reports.html, 9 pages.
Office Action dated Jan. 15, 2015 for U.S. Appl. No. 13/155,601, 44 pages.
U.S. Department of Energy,"Reliability Improvements from the Application of Distribution Automation Technologies-Initial Results". American Recovery and Reinvestment Act of 2009, Smart Grid Investment Grant Program, Dec. 2012. Retrieved on Jan. 15, 2015, 45 pages.
Office Action dated Jan. 13, 2016 for U.S. Appl. No. 13/155,601, 32 pages.
Notice of Allowance mailed Oct. 26, 2015 for U.S. Appl. No. 13/155,751, 102 pages.
European Office Action dated Dec. 8, 2015 for European Application No. 12170004.1, 4 pages.
Non-Final Office Action dated Oct. 2, 2015 for U.S. Appl. No. 13/155,594, 72 pages.
Johnson, "Smart Grid Demonstration Project—Dynamic Line Rating (DLR)," ERCOT Reliability Operations Subcommittee Meeting, Jun. 25, 2010, 20 Pgs.
Huang et al., "New Type of Fiber Optic Sensor Network for Smart Grid Interface of Transmission System" 2010 IEEE Power and Energy Society General Meeting, Jul. 25-29, 2010, pp. 1-5.
Office Action dated Jun. 24, 2016 for U.S. Appl. No. 14/593,988, 36 pages.
Final Office Action dated Mar. 17, 2016 for U.S. Appl. No. 13/155,594, 64 pages.
European Office Action dated Nov. 23, 2016 for European Application No. 12170004.1, 8 pages.
Baalbergen, et al.: "Outline of a New Hierarchical Agent-Based Voltage Instability Protection System", Proceedings of the 2010 IEEE Transmission and Distribution Conference and Exhibition, Jun. 14, 2010 (Jun. 14, 2010), XP031689278, DOI.' 10. 1109fTDC. 2010.5484647, 8 pages.
Guping Zheng, et al.: "Multi-Agent Based Control System for Multi-Microgrids", Proceedings of the 2010 International Conference on Computational Intelligence and Software Engineering, Dec. 30, 2010 (Dec. 30, 2010), XP031841252, DOI: 10. 1109IC/SE. 2010.5676818, 4 pages.
Office Action mailed Jan. 30, 2017 for U.S. Appl. No. 14/593,988, 39 pages.

\* cited by examiner

ENHANCED COMMUNICATION INFRASTRUCTURE FOR HIERARCHICAL INTELLIGENT POWER DISTRIBUTION GRID

TECHNICAL FIELD

The subject specification generally relates to intelligent power distribution grids, and, more particularly, to enhanced communication infrastructure for a hierarchical intelligent distribution grid.

BACKGROUND

Power grids have not undergone significant architectural changes since use of electricity for power was realized more than a century ago. The idea of a "Smart Grid" was introduced in the late 1990s, however, today, power grids still only employ limited intelligence in managing and providing power to consumers. Energy distribution systems are currently at a crossroads, as they confront the significant problem of imbalances of various kinds. Not only is the gap between supply and demand continuing to increase due to global population growth, but there also is a geographic imbalance in energy production and consumption patterns. These imbalances and uncertainties could be exacerbated in the future considering the rapidly increasing energy demands of newly industrialized nations, such as China, India, Brazil, and Russia, as these and other nations will compete for more generating sources to meet expected energy demands. While incorporating a wide variety of renewable (non-fossil fuel) energy sources is part of the solution to the increasing energy demands, it is not likely that incorporating renewable energy sources will be a panacea for the impending energy issues. Thus, it is clear that there also will have to be significant changes in the power distribution network to help meet future energy needs.

Currently, communications is one area where changes are being made to power grids to create Smart Grids. Presently, emerging Smart Grid networks are deployed using a variety of communications technologies, including wired (e.g., fiber, microwave, power line, etc.) as well as public and private wireless networks (e.g., a communication network employing an Institute of Electrical and Electronics Engineers (IEEE) 802.11-based protocol), using the licensed and unlicensed spectrum. In general, unlicensed wireless technologies, such as wireless technologies employing an IEEE 802.11-based protocol, can offer relatively low cost solutions for communication of information as compared to licensed wireless networks and wired networks, with the exception of power line carriers. However, both wireless and power line solutions face significant impediments with regard to Smart Grid communications, in terms of having to find an acceptable co-existence mechanism in the presence of increasing, diverse time and spatially varying interferences.

Historically, narrowband power line carrier (PLC) communications was developed for high voltage power lines within the transmission segment for long distances, using low frequencies (e.g., typically kHz range) and achieving very modest data rates (few kbps). Subsequently, the technique has been extended to the medium voltage distribution segment as well as in-home networks using higher frequency bands (e.g., around 1-30 MHz) and consequently achieving much higher signaling rates.

Utilities also have used unlicensed spectrum for automatic meter reading (AMR) applications, wherein a smart meter, which can be found at locations of both residential and commercial customers, allows electrical consumption information to be identified and transmitted to distribution-level control center (DCC), typically at periodic (e.g., monthly) times. Currently, new licensed spectrum allocation for SG does not appear to be on the horizon, leaving utilities to either use the unlicensed (e.g., 802.11-based technologies) or licensed cellular (e.g., Worldwide Interoperability for Microwave Access (WiMax) within 4G) technologies for the distribution secondary/primary scales. Another recent proposition centers around the potential application of cognitive radios for SG applications.

One significant issue with the deployment of wireless communication technologies with Smart Grids is the current inability to provide desirable Quality of Service (QoS) guarantees (e.g., reliability, performance). Further, in general there are many points in conventional distribution power grids where collection and communication of data is wholly lacking Still another issue regarding SGs in general is, if there is an increase in communications in a SG, there also will be an exponential increase in data being generated and communicated throughout the SG; and currently there is no way of dealing with large amounts of data (e.g., terabytes of data) that can be generated throughout a power grid in a way that is useful to operation of the power grid.

Additionally, the flat control topography of the traditional electrical distribution system is likely to face hurdles with the incorporation of distributed power generation systems. Many electrical power sources in distributed generation systems are time variant. For example, wind turbines are subject to power fluctuation in time based at least in part on wind speed, solar power is time variant based at least in part on cloud cover, plug-in electrical vehicles with surplus power can be disconnected at a moment's notice, etc. Distributed power generation is therefore likely to introduce a need for high speed adjustments to portions of the electrical distribution system, as close to real time adjustment as possible, and simultaneously be likely to produce a flood of electrical consumption data. In a flat control topography, this additional data flow is likely to exacerbate the deficiencies of data throughput and processing. This can result in slower dynamic adjustment of the distribution network where, in fact, faster adjustment is desirable due to the increased demand for processing of such data.

Further, additional sensitivity to communications network faults can cause the flat topography control system to become increasingly perilous to grid control and can seriously affect downstream consumers. As more data passes directly to the DCC due to the proliferation of smart devices generating consumable data for grid control, the DCC can become more dependent on this additional data for proper grid control. Where the DCC is dependent on this increased data flow for proper grid control, even minor diminished communication bandwidth can impair the flat grid control system by reducing the amount of data accessible for proper control. Hyper-dependable communications systems over an entire distribution grid is desirable for a reliable electrical system, but is burdened under the sheer volume of smart data anticipated in the future electrical grid.

The above-described deficiencies of today's systems are merely intended to provide an overview of some of the problems of conventional systems, and are not intended to be exhaustive. Other problems with the state of the art and corresponding benefits of some of the various non-limiting embodiments may become further apparent upon review of the following detailed description.

SUMMARY

The following presents a simplified summary of the various embodiments in order to provide a basic understanding of some aspects described herein. This summary is not an extensive overview of the disclosed subject matter. It is intended to neither identify key or critical elements of the disclosed subject matter nor delineate the scope of the subject embodiments. Its sole purpose is to present some concepts of the disclosed subject matter in a simplified form as a prelude to the more detailed description that is presented later.

The disclosed subject matter comprises enhanced communication infrastructure for a multi-tier hierarchical electrical distribution network (EDN) (e.g., smart distribution grid (SDG)). The EDN comprises a specified number of distribution network node controller (DNNC) components employed to desirably control communications and power distribution between respective tiers of the EDN to facilitate efficient power distribution. When communication between a DNNC in one tier and another DNNC in another tier, is desired, the DNNC can identify available communication channels and respective communication conditions of the available communication channels, and can dynamically select a subset of available data and preferred communication channel, based at least in part on predefined control criteria, to control data transmission loads in the network and facilitate real time control of the EDN. Data can be communicated via the selected communication channel. Respective DNNCs can desirably control power distribution for respective tiers, minimizing upper tier involvement in lower tier power distribution.

In accordance with various aspects, the disclosed subject matter can comprise a system that includes a first power distribution node that is configured to distribute power to one or more consumer consumption nodes (CCNs), wherein the first power distribution node and the one or more CCNs are located in a lowest tier in a multi-tier EDN. The system can further include a first node controller component that is configured to be interfaced with the first power distribution node, control the distribution of power by the first power distribution node to the one or more CCNs, and control communication of data between the first node controller component and at least one other node controller component, in accordance with predefined control criteria.

In accordance with various other aspects, the disclosed subject matter can comprise a method that includes the acts of controlling distribution of power to one or more CCNs in a lowest level of a multi-level power distribution network (PDN) at the lowest level, wherein the multi-level PDN comprises the lowest level and at least one other level that is higher than the lowest level in the hierarchy of the multi-level PDN; and controlling data communications between a first network node controller component located in the lowest level and at least one other network node controller component to facilitate controlling the distribution of power in the lowest level, wherein the distribution of power and the data communications are respectively controlled in accordance with predefined control criteria.

In accordance with still other aspects, the disclosed subject matter can comprise a system that includes means for controlling distribution of power to one or more CCNs in a lowest level of a multi-tier EDN at the lowest tier, wherein the multi-tier EDN comprises the lowest tier and at least one other tier that is higher than the lowest tier in the hierarchy of the multi-tier EDN. The system can further include means for controlling data communications between a lowest-tier network node controller component located in the lowest tier and at least one higher-tier network node controller component located in at least one higher tier in the multi-tier EDN to facilitate controlling the distribution of power in the lowest tier, wherein the distribution of power and the data communications are respectively controlled in accordance with predefined control criteria.

The following description and the annexed drawings set forth in detail certain illustrative aspects of the disclosed subject matter. These aspects are indicative, however, of but a few of the various ways in which the principles of the various embodiments may be employed and the disclosed subject matter is intended to include all such aspects and their equivalents. Other advantages and distinctive features of the disclosed subject matter will become apparent from the following detailed description of the various embodiments when considered in conjunction with the drawings.

DETAILED DESCRIPTION

Figure 1:
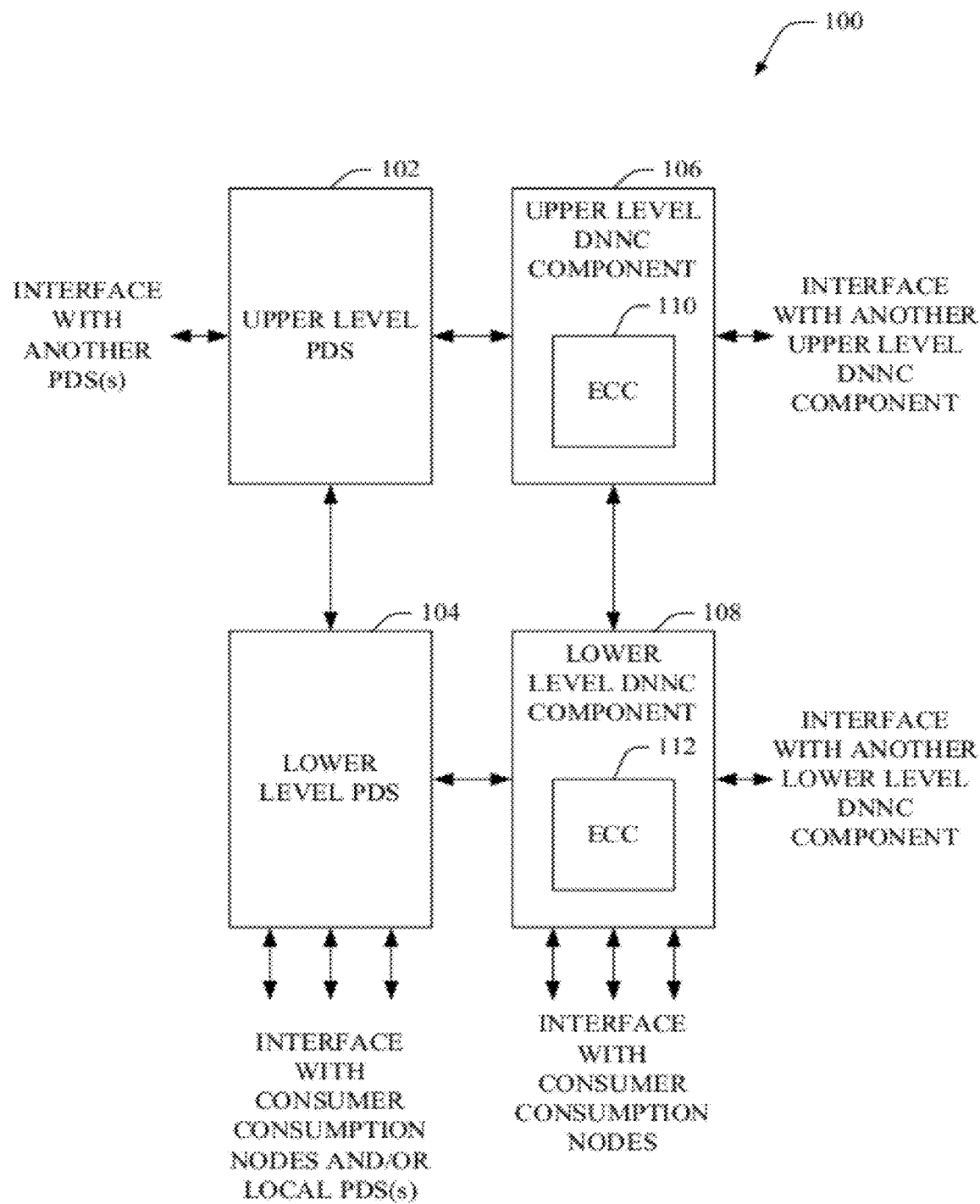
FIG. 1 illustrates a block diagram of an example system having a hierarchical communication and control architecture for an electrical distribution network (EDN) in accordance with various aspects and embodiments of the disclosed subject matter.

The disclosed subject matter is described with reference to the drawings, wherein like reference numerals are used to refer to like elements throughout. In the following description, for purposes of explanation, numerous specific details are set forth in order to provide a thorough understanding of the various embodiments of the subject disclosure. It may be evident, however, that the disclosed subject matter may be practiced without these specific details. In other instances, well-known structures and devices are shown in block diagram form in order to facilitate describing the various embodiments herein.

As used in this application, the terms "component," "system," "platform," "interface," "node", "source", and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

The disclosed subject matter comprises an enhanced communication infrastructure for a multi-tier hierarchical electrical distribution network (EDN) (e.g., smart distribution grid (SDG)). The EDN comprises a specified number of distribution network node controller (DNNC) components employed to desirably control communications and power distribution between respective tiers of the EDN to facilitate efficient power distribution. When communication between a DNNC in one tier and another DNNC in another tier, is desired, the DNNC can identify available communication channels and respective communication conditions of the available communication channels, and can dynamically select a subset of available data and preferred communication channel, based at least in part on predefined control criteria, to control data transmission loads in the network and facilitate real time control of the EDN. Data can be communicated via the selected communication channel. Respective DNNCs can desirably control power distribution for respective tiers, minimizing upper tier involvement in lower tier power distribution. Aspects of the disclosed subject matter can be incorporate in legacy power systems or can be part of a new EDN.

Referring to the drawings, FIG. 1 is a block diagram of an example system 100 having a hierarchical communication and control architecture for an EDN in accordance with various aspects and embodiments of the disclosed subject matter. The system 100 can provide hierarchical and decentralized control of and communication (e.g., two-way communication) relating to distribution nodes (e.g., power distribution sources (PDSs)) in the power grid in the EDN (which also can be referred to as a power distribution network (PDN)). In an aspect, the system 100 can include an upper level PDS 102 that can generate and/or supply electrical power to one or more consumer consumption nodes (CCNs) (e.g., residential premises, commercial premises, etc.) associated with the upper level PDS 102.

In another aspect, the system 100 can comprise a lower level PDS 104 that can be electrically connected to the upper level PDS 102, wherein the lower level PDS 104 can be under the upper level PDS 102 in the hierarchy of the EDN and can be employed to distribute electrical power to the one or more CCNs associated with (e.g., electrically connected to) the lower level PDS 104. Typically, the upper level PDS 104 can provide power at a higher voltage level (e.g., greater than 100 kilovolts (kV)) (e.g., after the voltage of the electric power is stepped-up to facilitate efficient transmission) via electrical lines to the lower level PDS 104, and the lower level PDS 104 can convert (e.g., transform, step-down, etc.) the higher voltage level to a desired lower voltage level (e.g., 110 volts (V), 220 V, . . . , 4 kV, . . . , 13 kV, . . . ) suitable for use at the CCNs. For example, the upper level PDS 102 can be a power generation plant that serves a certain geographical area (e.g., city, county, district, or other defined area), and the lower level PDS 104 can be a distribution transformer (e.g., electromagnetic type of distribution transformer) that can be attached to a pole or a pad at or near a portion of the certain geographical area wherein the subset of CCNs associated with the lower PDS 104 are located to distribute the desired power to those associated CCNs. In an aspect, the upper level PDS 102 also can be associated with (e.g., electrically connected to or interfaced with) other upper level PDSs (not shown in FIG. 1 for reasons of brevity and clarity) in the EDN to facilitate transferring power between the upper level PDSs to enable the respective upper level PDSs to meet power needs in their respective portions of the EDN.

While the system 100 is illustrated herein to show that the lower level PDS 104 receives power from the upper level PDS 102 to supply power to the CCNs, the disclosed subject matter is not so limited, as in accordance with various embodiments, a CCN also can comprise or be associated with (e.g., electrically connected to) a local PDS (e.g., solar power generation system, wind power generation system, geothermal power generation system, hydroelectric power generation system, diesel-type power generation system, stored power (e.g., power stored in charged batteries of an electric or hybrid vehicle), etc.) that can produce and/or otherwise provide power for use by the CCN to reduce or even eliminate the need for that CCN to obtain power from the power grid via the lower level PDS 104 and/or can provide power to other CCNs associated with the power grid, such as, for example, CCNs that are associated with the same lower level PDS 104, when the power source of the CCN generates power in excess of the amount of power used and/or stored by that CCN, as more fully disclosed herein. For instance, the local power source of the CCN can provide any excess power to another CCN(s) directly or, more typically, via the lower level PDS 104, wherein, for example, routing the power via the lower level PDS 104 can facilitate desired tracking of the amount of power being provided to the power grid by the local power source.

Conventionally, power distribution systems are "top down" systems whereby power is distributed down from a central power generation system to transformers that transform the power and supply it to CCNs with limited communication of information (e.g., information limited to periodic (e.g., monthly) power usage information) from the lower nodes (e.g., CCNs via enhanced consumer meters (ECMs), such as smart meters or other meters employing advanced metering infrastructure (AMI)) in the power grid to the central power generation system. It is desirable to have improved communication between lower nodes and upper nodes in the EDN to more efficiently distribute power; however, there can be large amounts of data (e.g., multiple terabytes) generated relating to power conditions and communication conditions associated with the EDN, which is expected to increase in the future as more micro PDSs (e.g., solar power generation system, wind power generation system, etc.) associated with power consumers/producers are connected to the EDN, particularly to the large amounts of data that is expected to be produced due to the time-variant nature of the power produced by or available from such micro PDSs, as it can be desirable to be able to control power distribution on a more refined level (e.g., on the order of seconds, milliseconds, or on an even more refined level) to account for the time-variant nature of the power produced by or available from the micro PDSs. Management of the communication of such data reliably and securely is desirable. Further, there are a number of available communication paths, both wired and wireless paths, employing disparate communication technologies, and it is desirable to be able to utilize such communication paths and technologies in an efficient manner (e.g., efficient with regard to reliability, security, cost, etc.). Today, there is no way to overcome these and other challenges and deficiencies in the conventional technology relating to power distribution.

To that end, in accordance with various aspects, the system 100 can provide an enhanced communication infrastructure to facilitate efficient power distribution to CCNs associated with the power grid that overcomes the deficiencies in the conventional technology relating to power distribution. In an aspect, the system 100 can employ a specified number of communication and/or control nodes (e.g., distribution network node controller (DNNC) components) that can be respectively associated with distribution nodes, also referred to as distribution network nodes, in the EDN to facilitate efficiently controlling power distribution in a hierarchal and de-centralized manner. The disclosed subject matter can employ the communication control and power distribution control exercised by the lower level nodes to facilitate maximizing the net power consumption of the CCNs at the lower hierarchy level of the EDN so that there is reduced or minimal involvement of the upper level nodes of the EDN in the supplying of power to the CCNs associated with a lower level PDS and lower level DNNC component, as more fully disclosed herein. The upper level PDS 102 can be associated with (e.g., connected to or interfaced with) an upper level DNNC component 106 that can be employed to monitor conditions (e.g., power conditions, communication conditions, etc.) associated with the upper level PDS 102 and/or node points below the upper level DNNC component 106 in the hierarchy at a desired level of granularity (e.g., monitor each second, each millisecond, or at another desired level of granularity) to facilitate real time, or at least near real time, control of power distribution and communications in the EDN. Based at least in part on the observed conditions, the upper level DNNC component 106 can (e.g., dynamically or automatically) control power distribution and/or perform other actions with regard to the upper level PDS 102 or lower level PDS 104.

In an aspect, the upper level DNNC component 106 can be communicatively connected to a lower level DNNC component 108, which can be associated with (e.g., connected to or interfaced with) the lower level PDS 104. The lower level DNNC component 108 can monitor conditions (e.g., power conditions, communication conditions, etc.) associated with the lower level PDS 104 and/or node points (e.g., CCNs, local power sources, etc.) below the lower level DNNC component 108 in the hierarchy to facilitate controlling power distribution on a more refined level for the portion of the power grid covered by the lower level DNNC component 108, so that power distribution can be dynamically and efficiently controlled. For instance, the lower level DNNC component 108 can monitor conditions in the lower tier of the hierarchy at a desired level of granularity (e.g., monitor each second, each millisecond, or at another desired level of granularity) to facilitate real time, or at least near real time, control of power distribution and communications in the EDN. In accordance with various aspects, the upper level DNNC component 106 also can be communicatively connected to one or more other upper level DNNC components (not shown in FIG. 1 for reasons of brevity and clarity) in the EDN to facilitate communicating data regarding power-related conditions in the EDN between the upper level DNNC components to facilitate efficiently controlling power distribution in the EDN.

In still another aspect, the DNNC components 106 and 108 respectively can include enhanced control component (ECC) 110 and ECC 112, each of which can obtain, aggregate, and process data relating to the conditions of the respective PDS(s) managed by them to facilitate controlling power distribution in the respective portions of the grid controlled by them. The ECC 110 and ECC 112 can control communications between the respective DNNC components 106 and 108 and other nodes in the EDN to enable real time or at least near real time communication of data between such nodes in the EDN (e.g., communication of data at the rate of one second or more, or at a subsecond rate (e.g., at a rate on the order of tenths of seconds, hundredths of seconds or milliseconds) to facilitate real time control of communications).

In one aspect, the ECC 112 can monitor conditions (e.g., power conditions, communication conditions, etc.) relating to the portion of the power grid for which the lower level PDS 104 distributes power and the lower level DNNC component 108 controls communication and power distribution. For example, there can be one or more sensors (not shown in FIG. 1; as shown with regard to the sensor component disclosed in relation to FIG. 6) that can be distributed at or near the lower level PDS 104 and/or at other points in the portion of the power grid associated with the lower level PDS 104 and lower level DNNC component 108, wherein the one or more sensors can comprise various types of sensors (e.g., sensor(s), such as a power sensor, heat sensor, fault sensor, etc., to monitor power conditions (e.g., power levels, heat levels, etc.) and/or faults; sensor(s) to monitor communication conditions (e.g., signal strength, data communication rates, quality of service (QoS), etc.); etc.). The ECC 112 can obtain data from the respective sensors and can process such data to facilitate determinations relating to controlling power distribution associated with the lower level PDS 104 and controlling communications and other control aspects associated with the lower level DNNC component 108 (e.g., the ECC can control power distribution and communications at the rate of one second or more, or at a subsecond rate (e.g., at a rate on the order of tenths of seconds, hundredths of seconds or milliseconds) to facilitate real time control of power distribution and communications). In an embodiment, the ECC 112 (and/or ECC 110) can comprise or can be associated with (e.g., communicatively connected to) a Frequency monitoring Network (FNET) that can be employed as a power system frequency measurement system that can accurately measure power system frequency, voltage and angle in real time (or at least near real time), and can facilitate desired real time (or at least near real time) control of power distribution in the EDN, wherein the FNET can be, for example, a phasor measurement unit (PMU) FNET (PMU/FNET), wherein the PMU can be, for example, a frequency disturbance recorder (FDR).

For instance, the ECC 112 can analyze or evaluate the data, filter the data, abstract the data, or otherwise process the data from the sensors to make determinations for local (e.g., lower level) control of the associated portion of the power grid (e.g., power distribution in the portion of the power grid, provide for protection of system devices in the portion of the power grid in response to a detected fault or undesired parameter value, etc.), or to generate a subset of data (e.g., abstract or summary of the obtained or processed data) that can be communicated to the upper level DNNC component 106 for processing to facilitate making determinations for control of that portion of the power grid and/or control of other portions of the power grid controlled by the upper level DNNC component 106.

The collection of data from sensors in the EDN (e.g., lower level of the EDN) at a desired fine level of granularity (e.g., on a second, millisecond, or even more refined granularity) along with the processing (e.g., analyzing) of such data and/or other data, which can generate even more data, can result in a large amount of data (e.g., many gigabytes or terabytes of data) collected at the lower level of the EDN. It is to be appreciated and understood that transmitting all of the data (e.g., collected data, analysis-generated data, other data) from the lower level DNNC 108 to the upper level DNNC 106 can be undesirable for a number of reasons, as some of the data may not be needed by the upper level DNNC 106 since such data can relate to aspects or functions being controlled by the lower level DNNC 108 and not the upper level DNNC 106, and communication of such large amounts of data can or may overload the communication network and impair real time control of power distribution and communications in the EDN, especially when the upper level DNNC 106 is receiving respective large amounts of data from multiple lower level DNNCs (e.g., 108) associated with the portion of the EDN controlled by the upper level DNNC 106, among other reasons.

In accordance with various aspects, the lower level DNNC 108, employing the ECC 112, can select a desired subset of data from the available data (e.g., collected data, analysis-generated data, other data), in accordance with the predefined control criteria, as more fully disclosed herein. For example, the ECC 112 can filter or abstract data obtained from sensors to facilitate reducing the amount of data communicated to the upper level DNNC component 106. For instance, the ECC 112 can monitor a particular power condition and can obtain measurements of that power condition for each sample time, which, for example, can be finely granularized to a desired level (e.g., on the order of milliseconds, seconds, minutes, . . . ). It may not be necessary for the upper level DNNC component 106 to have knowledge of all of the parameter values of the particular power condition parameter, but rather only desirable for the upper level DNNC component 106 to have knowledge of certain parameter values (e.g., a maximum power condition parameter value over a specified number of samples, a power condition parameter value that is outside of a predefined threshold acceptable parameter value or set of values, an average or mean parameter value and/or standard deviation over a specified number of samples, etc.). The ECC 112 can evaluate and process the obtained data (e.g., perform calculations on the obtained data, filter out data from the obtained data) to generate a subset of data (e.g., a filtered subset of data that contains a parameter value(s) that is outside of the predefined threshold acceptable parameter value(s); or an abstract or summary of the data that includes an average or a mean of the parameter values obtained over a specified number of samples or period of time), in accordance with predefined control criteria (and corresponding predefined control rules), as more fully disclosed herein. The subset of data can be communicated from the lower level DNNC component 108 to the upper level DNNC component 106 via a desired communication channel (e.g., wired or wireless communication channel) using a desired communication technology (e.g., DSL, cellular, an Institute of Electrical and Electronics Engineers (IEEE) 802.11-type protocol, etc.) for processing and evaluation by the ECC 110 to facilitate controlling power distribution over the portion of the grid controlled by the upper level PDS 102, wherein the desired communication channel can be automatically or dynamically selected in accordance with the predefined control criteria, as more fully disclosed herein. The disclosed subject matter can thereby control the amount of data being communicated via communication channels to limit the data to such data that is desired by the upper level DNNC component 106 or other upper level node(s) to control (e.g., reduce) the load on the communication channels and facilitate real time, or at least near real time, data communication between nodes in the EDN.

The ECC 110 can receive the subset of data from the lower level PDS 108, and can analyze, evaluate, and/or otherwise process that subset of data to facilitate making determinations for controlling the portion of the power grid controlled by the upper level DNNC component 106, including controlling that portion of the power grid associated with the lower level DNNC component 108 and/or other portions of the power grid associated with other lower level DNNC components (not shown) that are under the control of the upper level DNNC component 106. Based at least in part on the processing of the subset of data, the ECC 110 can generate control information (e.g., power-related parameter values, control information or commands for power distribution, etc.), which can be communicated via a desired communication channel to the lower level DNNC component 108, another lower level DNNC component (not shown) associated with the upper level DNNC component 106, or another upper level DNNC component 106, to facilitate desirably controlling power distribution in the EDN.

As disclosed herein, the system 100 can employ various types of communication channels and technologies (e.g., wireline communication channels, such as digital subscriber line (DSL)-type channels, Ethernet-type channels, broadband-type channels, cable communication channels, power line carrier (PLC)-type communication channels, wherein a PLC-type communication channel can include, for example, a Broadband over Power Lines (BPL)-type communication channel or a distribution line carrier (DLC)-type communication channel, etc.; and wireless communication channels, such as cellular communication channels, communication channels based on an IEEE 802.11-type protocol(s) (e.g., IEEE 802.11a protocol, IEEE 802.11b protocol, IEEE 802.11g protocol, IEEE 802.11n protocol, etc.), which can be used, for example, to implement a wireless local area network (WLAN) or a wireless metropolitan area network (WMAN), communication channels based on an IEEE 802.16-type protocol(s) (e.g., IEEE 802.16.2-2004, IEEE 802.16k-2007, IEEE 802.16-2009, IEEE 802.16j-2009, IEEE 802.16h-2010, IEEE P802.16m, IEEE P802.16n, IEEE P802.16p, etc.) (also can be referred to as wireless broadband), Worldwide Interoperability for Microwave Access (WiMax)-type communication channels, femtocell communication channels, satellite communication channels, etc.), which can have respective communication conditions, costs, etc., associated therewith. For example, a wireless communication network employing an IEEE 802.11 type protocol typically can operate in the unlicensed 2.4 and 5 GHz radio bands, at an 11 Mbps (in accordance with IEEE 802.11b protocol) or a 54 Mbps (in accordance with an IEEE 802.11a protocol) data rate, for example, or with products that contain both bands (dual band), so the network can provide real-world performance similar to the basic "10BaseT" wired Ethernet networks used in many offices.

In an aspect, to facilitate desired data communications, the ECC 110 and/or ECC 112 (or a communication component associated with a CCN) can dynamically or automatically select or switch to a specified communication channel or communication technology to facilitate communication of data between the upper level DNNC component 106 and lower level DNNC component 108, or between the lower level DNNC component and a communication component associated with a CCN, or between the upper level DNNC component 106 and another upper level DNNC component 106, based at least in part on the predefined control criteria, which can comprise predefined communication channel selection criteria. In identifying, determining, or selecting a communication channel or communication technology to utilize to communicate a particular set of data, the ECC 110 or ECC 112 can apply the predefined communication channel selection criteria (or corresponding predefined communication channel selection rules), which can relate to, for example, the amount of data to be communicated, the type of data (e.g. current power condition data, abstract or filtered subset of power condition data, fault data, power control data, communication control data, etc.), the priority of the data (e.g., high priority or emergency data, standard priority, low priority, etc.), the respective communication conditions (e.g., quality of service (QoS), data communication rates, communication channel congestion, etc.) of respective communication channels (e.g., wireline communication channel, wireless communication channel), respective costs of communication of the data for the respective communication channels, current availability of respective communication channels, time of day of data communication (e.g., peak-time communication times, off-peak communication times), etc.

For example, data that meets a predefined high level of priority threshold can be transmitted via one type of communication channel or technology over another type of communication channel or technology because the one type of communication channel or technology is more reliable or desirable (e.g., more desirable QoS and/or faster data communication rate) than the other type, even if communication via the one type is more costly than communication via the other type, when the predefined communication channel selection criteria (or corresponding rule(s)) so specifies. As another example, the predefined communication channel selection criteria (or corresponding rule(s)) can specify that data is to be communicated via a wireless communication channel using an IEEE 802.11 type protocol or standard so long as the communication conditions for such wireless communication channel at least meet a predefined QoS level and data communication rate, or communicated via another communication channel (e.g., a wireline or other communication channel that meets the predefined QoS level and data communication rate) when that wireless communication channel does not meet the predefined QoS level and data communication rate.

In accordance with various other aspects, as more fully disclosed herein, the ECC 110 and ECC 112, respectively, can compress/decompress data (e.g., the subset of data) being transmitted to/received from the respective DNNC components 106 or 108, or other component (e.g., control or communication component associated with a consumer consumption point), in accordance with a specified compression/decompression algorithm(s) (e.g., lossless compression algorithms, such as Lempel-Ziv (LZ) compression algorithm, LZ-Renau (LZR) compression algorithm, Huffman coding, DEFLATE, etc.; lossy compression algorithms, such as Mu-law Compander, A-law Compander, Modulo-N code, etc.), to facilitate reducing the amount of data bits being communicated thereby easing the communication load on the communication channel(s) between the upper level DNNC component 106 and the lower level DNNC component 108 or other component; encrypt data transmitted or decrypt data received from a DNNC component (e.g., 106 or 108) or other component, in accordance with a specified cryptographic algorithm(s) and protocols (e.g., data encryption standard (DES)-type algorithms, advanced encryption standard (AES)-type algorithms, symmetric key algorithms, etc.), to facilitate securing communicated data; employ desired data redundancy to facilitate recovery of data in case of data corruption; etc.

It is to be appreciated and understood that, while system 100 includes a single lower level DNNC associated with a single lower level PDS, the subject specification is not so limited, as in accordance with various embodiments, there can be one or more lower level DNNC components associated with a single lower level PDS, as desired. For example, one lower level PDS may serve 500 CCNs, wherein it can be desirable to break the group of 500 CCNs into a number of smaller sub-groups (e.g., 10 sub-groups of 50 CCNs each) which can respectively be associated with a corresponding number of lower level DNNC components. In accordance with various embodiments, one of the number of lower level DNNC components can act as a master lower level DNNC component in relation to the other lower level DNNC components, or there can be an additional lower level DNNC component that acts as a master lower level DNNC component, wherein the master lower level DNNC component can be interfaced with the lower level PDS, or the lower level DNNC components can coordinate with each other without a master DNNC component and can interface with the lower level PDS, as desired.

The disclosed subject matter, by controlling communications and power distribution in a multi-tier EDN in real time (or at least near real time), can desirably control operations of the EDN to achieve desirable demand response through desirable (e.g., optimal) management of the usage of high power appliances, reducing peak demand on the EDN and reducing the need for additional expensive power generation; can provide for integrated real and reactive power management by managing loss reduction in the system and volt/volt-amperes reactive (volt/var) control and recognizing that loss reduction and volt/var control are intertwined with each other, since change of voltage affects both real and reactive flow in AC power systems; desirable (e.g., optimal) scheduling of micro power sources (e.g., distribution grids, such as solar power generation systems, wind power generation systems, etc.) and electric or hybrid vehicles (e.g., plug-in electric vehicles (PEV), plug-in hybrid electric vehicles (PHEV)) or other large power consumption devices or appliances, based at least in part on the status of the EDN, in accordance with the predefined control criteria; can provide adaptive secondary distribution system protection to protect distribution transformers on the low voltage side, and can employ protection devices for the distribution transformers that can coordinate with the high voltage side on the primary side of the distribution system and each of the CCNs (e.g., at the ECM or main breaker) on the load side of the system, to facilitate improved reliability; can manage assets (e.g., PDSs, DNNCs, power lines, sensors, etc.) in accordance with the predefined control criteria to improve the life cycle of the respective assets, for example, by minimizing the transfer of power throughout the EDN and thereby minimize the use of system components to transfer power throughout the EDN to thereby reduce the wear and tear on such system components; etc.

Figure 2:
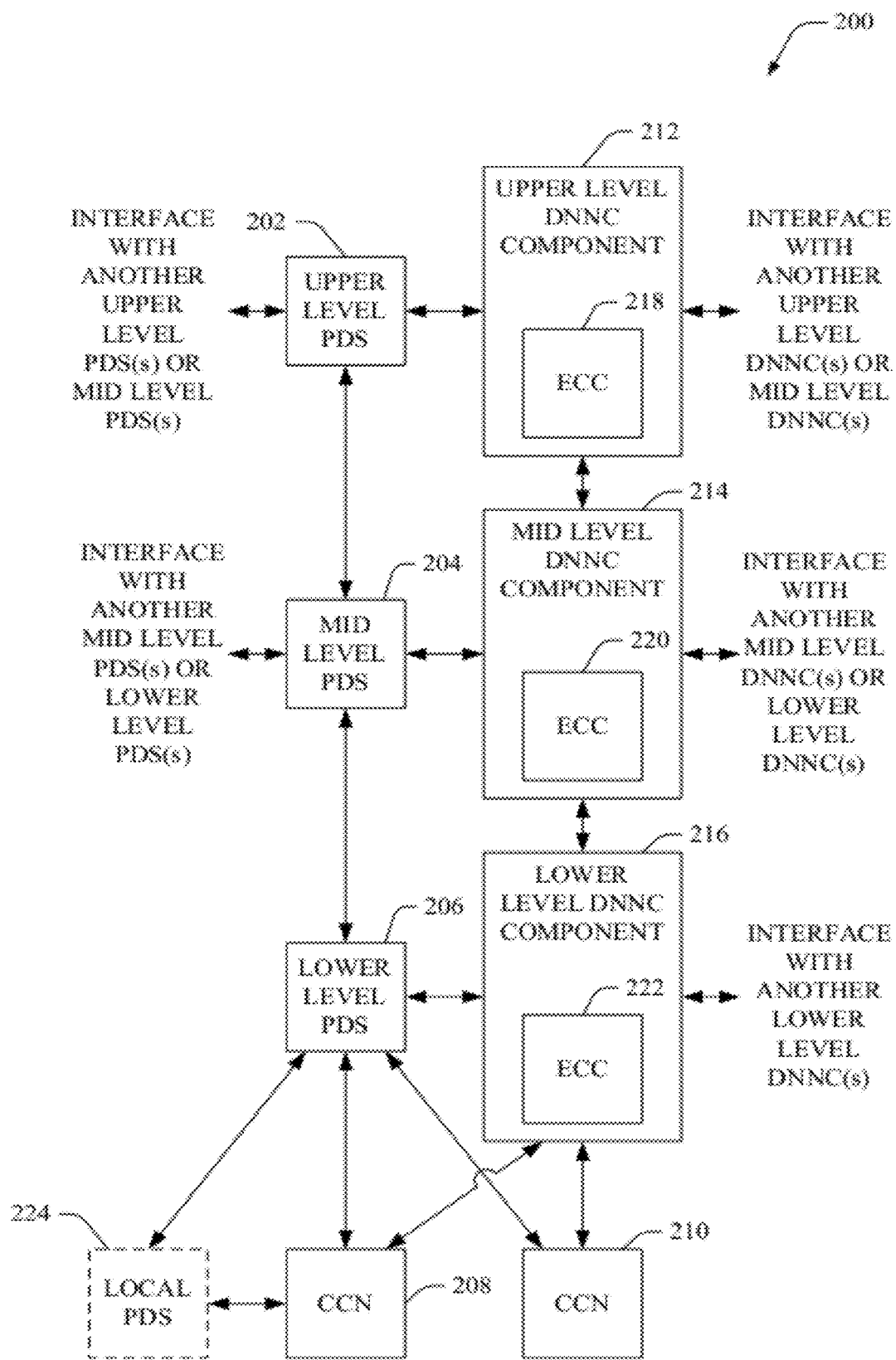
FIG. 2 depicts a block diagram of an example system having a multi-tier hierarchical communication and control architecture for an EDN in accordance with various aspects and embodiments of the disclosed subject matter.

Turning to FIG. 2, depicted is a block diagram of an example system 200 having a multi-tier (e.g., three-tier) hierarchical communication and control architecture for an EDN in accordance with various aspects and embodiments of the disclosed subject matter. The system 200 can be employed to facilitate real time, or at least near real time, communications and control of communications (e.g., communications and control of communications at a rate of second(s) or at a subsecond rate) between various control nodes at various levels in the hierarchy to facilitate real time, or at least near real time, control of power distribution to CCNs in the EDN (e.g., control of power distribution to CCNs in the EDN at a rate of second(s) or at a subsecond rate). In an aspect, the system 200 can comprise an upper (e.g., top) level PDS 202, middle (mid) or intermediate level PDS 204, and a lower (e.g., lowest) level PDS 206, wherein the upper level PDS 202 (e.g., power generation plant) and lower level PDS 206 (e.g., distribution transformer) each can be the same as or can comprise the same or similar functionality as respective components as more fully disclosed herein. The mid level PDS 204 can be associated with (e.g., electrically connected to) the upper level PDS 202 and lower level PDS 206, and can be, for example, a power sub-station in between the upper level PDS 202 and lower level PDS 206 in the power distribution chain. The mid level PDS 204 can receive higher voltage level electrical power from the upper level PDS 202 and can convert the higher voltage level of the electrical power to a middle voltage level that is lower than the higher voltage level, wherein the mid level PDS 204 can transfer the electric power having the mid voltage level to one or more lower level PDSs, such as lower level PDS 206, which can convert the mid voltage level of the electric power to a lower voltage level suitable for use by the CCNs, such as CCNs 208 and 210, associated with the lower level PDS(s) (e.g., 206), and the power having the lower voltage level can be distributed to the CCNs, as desired.

In another aspect, the upper level PDS 202 can be associated with (e.g., connected to or interfaced with) an upper level DNNC component 212, the mid level PDS 204 can be associated with a mid level DNNC component 214, and the lower level PDS 206 can be associated with a lower level DNNC component 216. The upper level DNNC component 212 and lower level DNNC component 216 each can be the same or similar as or can comprise the same or similar functionality as respective components as more fully disclosed herein. The mid level DNNC component 214 can comprise the same or similar functionality as the upper level DNNC component 212 or lower level DNNC component 216, except that the mid level DNNC component 214 can be employed to facilitate controlling power distribution for the mid level PDS 204, for example, to one or more lower level PDSs (e.g., 206) associated with the mid level PDS 204, and control communication of data between the mid level DNNC component 214 and other control nodes associated therewith (e.g., upper level DNNC component 212, lower level DNNC component 216). In still another aspect, the upper level DNNC component 212 can include an ECC 218, the mid level DNNC component 214 can include ECC 220, and the lower level DNNC component 216 can include ECC 222, wherein the respective ECCs can be the same or similar as or can comprise the same or similar functionality as respective components, such as more fully disclosed herein.

The system 200 can be a multi-level (e.g., three-tier) integrated distribution management system (IDMS), that can comprise, for example, an upper level of the hierarchy of the EDN, comprising the upper level PDS 202 and associated upper level DNNC component 212, also can be referred to as a smart distribution management system (SDMS); a mid level of the hierarchy of the EDN, comprising the mid level PDS(s) (e.g., 204) and associated mid level DNNC component(s) (e.g., 214), also can be referred to as a smart mini distribution management system (SmDMS); and the lower level of the hierarchy of the EDN, comprising the lower level PDS(s) (e.g., 206) and associated lower level DNNC component(s) (e.g., 216), also can be referred to as a smart micro distribution management system (SmDMS). The multi-level hierarchical system can decentralize the intelligence aspects of the system 200 by incorporating intelligence into each level of the hierarchy to facilitate advancing real time, or at least near real time, automation (e.g., relating to sensing, control, protection, etc.) of components associated with the system 200. In accordance with various aspects, the system 200 can manage data collection, archiving, and retrieval to facilitate reducing or minimizing communication latency of data flow between control nodes in various levels of the hierarchy. As more fully disclosed herein, the system 200 can employ two-way communication at each level of the hierarchy, wherein each level of the hierarchy can employ respective communication standards and protocols, as well as respective communication bandwidths.

It is to be appreciated and understood that, in accordance with various non-limiting embodiments, while the DNNCs and PDSs have respectively been referred to as upper level DNNC component, upper level PDS, mid level DNNC component, mid level PDS, lower level DNNC component, and lower level PDS, as desired, the respective components also can be referred to as a first level DNNC component, first level PDS, second level DNNC component, second level PDS, third level DNNC component, or third level PDS. Further, one or more embodiments also can include a fourth, a fifth, or more levels of respective components (e.g., DNNCs, PDSs, etc.) in the multi-level EDN. Further, the terms "parent" or "senior" can indicate a higher level DNNC component and the terms "child" or "junior" can indicate a DNNC component (e.g., lower level DNNC component) or PDS that is at a lower level in the hierarchy than the higher level (e.g., "parent" or "senior") DNNC or PDS, and the term "tier" can be used as an alternative to the term "level", as desired.

In an aspect, the disclosed subject matter can employ the communication control and power distribution control exercised by the lower level nodes to facilitate maximizing the net power consumption of the CCNs at the lower hierarchy level of the EDN so that there is reduced or minimal involvement of the upper level nodes of the EDN in supplying of power to the CCNs associated with a lower level PDS and lower level DNNC component. The lower level DNNC 216 can control the power distribution associated with the lower level PDS 206 to the CCNs 208 and 210 with reduced or minimal involvement of the mid level PDS 204 and associated mid level DNNC component 214, and upper level PDS 202 and associated upper level DNNC component 212, in supplying of power to the CCNs associated with a lower level PDS and lower level DNNC component, in accordance with aspects disclosed herein. In another aspect, the mid level DNNC component 214 can control the power distribution associated with the mid level PDS 204 to the lower level PDSs (e.g., 206) (and thereby the CCNs (e.g., 208, 210) respectively associated therewith), with reduced or minimal involvement of the upper level PDS 202 and associated upper level DNNC component 212, in management of power distribution associated with a mid level PDS and mid level DNNC component, in accordance with aspects disclosed herein.

For example, the lower level DNNC component 216 can control power distribution by the lower level PDS 206 to route excess or available power from a local PDS, such as local PDS 224 (e.g., solar power generation system) (depicted in FIG. 2 with a dotted line to indicate the local PDS 224 may or may not be part of system 200 and/or connected to lower level PDS 206), associated with a CCN (e.g., 208) from the local PDS 224 to another CCN (e.g., 210) associated with the lower level PDS 206 via the lower level PDS 206 without having to involve the higher level PDSs (e.g., upper level PDS 202, mid level PDS 204) or higher level DNNC components (e.g., upper level DNNC component 212, mid level DNNC component 214) (e.g., without having to transfer power from the mid level PDS 204 to the other CCN 210 via the lower level PDS 206), for example, when sufficient power is available from the local PDS 224, or can minimally involve the higher level PDS(s) to transfer only the amount of power to the other CCN 210 needed to make up for any amount of power that the local PDS 224 cannot supply to the other CCN 210. As a result, there can be a reduction in unnecessary and wasteful transferring of electrical power via power lines from the nodes higher up in the hierarchy in the EDN when there is more local electrical power available for distribution by the lower level nodes, which can reduce the undesired (e.g., unnecessary) costs incurred due to the undesired power transfers and wear and tear on assets (e.g., power lines, transformers, etc.) and reduce undesired energy losses due in part to the heating of assets which drains off energy while transferring that power.

As another example, the CCNs 208 and 210, and or other CCNs (not shown) in the lower level, may each have PEV or PHEV and attempt to plug them in to access the EDN at the same time, wherein the power demanded by the plugging in of all of these vehicles at the same time can be more power than the maximum power rating of the lower level PDS 206 (above which could result in damage or destruction of the PDS) or more power than is available from the various power sources (e.g., upper and or mid level PDSs, local PDSs) providing power to the portion of the EDN for which the lower level PDS 206 distributes power. The lower level DNNC 216, employing the ECC 222 and/or other components (e.g., sensors) can detect that the amount of power demanded by the CCNs exceeds the amount of power that can be provided, and can desirably control power distribution to the CCNs, in accordance with the predefined control criteria, so that the lower level PDS 206 is not negatively affected (e.g., damaged or destroyed) and/or available power is desirably distributed (e.g., apportioned) among the CCNs. For instance, the lower level DNNC 216 can send control information to the lower level PDS 206 to control power distribution of the lower level PDS 206 so that the lower level PDS 206 shares the available power among the CCNs (e.g., by distributing power in short time intervals to respective CCNs in accordance with a revolving round-robin scheduling algorithm), and/or can send a request to one or more of the CCNs requesting that the respectively associated consumers discontinue charging their respective vehicles at that time (e.g., in accordance with a power consumption agreement with the consumer, which may or may not provide an incentive for discontinuing or reducing power consumption in response to a request to do so), for a specified period of time or until further instruction.

As still another example, if power to the lower level PDS 206 from the mid level PDS 204 or upper level PDS 202 is interrupted (e.g., due to power outage at the sub-station or power generation plant, or due to the transmission lines or other components associated with delivering power to the lower level PDS being impaired), the lower level DNNC 216 can identify whether there is any power available from local PDSs, such as local PDS 224, located in the lowest level of the multi-level EDN, and can allocate any available power in accordance with the predefined control criteria. For instance, power can be allocated to CCNs (e.g., 208, 210) in accordance of priority of power needs of respective CCNs located within the portion of the lower level controlled by the lower level DNNC 216, where, for example, a CCN having a consumer (e.g., hospital, person with medical care needs living at his/her residence) needing power for medical reasons (e.g., to operate electronic medical equipment) can have priority over other consumers in other CCNs with regard to allocation of the available power, when in accordance with the predefined control criteria.

In yet another example, the lower level DNNC 216 can identify a device, such as a PEV, PHEV, communication device (e.g., laptop computer, mobile phone), portable electrical appliance, etc., that is being plugged in to an outlet associated with a CCN (e.g., 208, 210) that is remote from a home location (e.g., residence) of the consumer who owns the device using a data tag, device identifier (ID), authentication credentials, etc., associated with the device, in accordance with the predefined control criteria. For example, a consumer can plug his device (e.g., PEV, PHEV)

into an outlet at a remote location (e.g., a CCN, such as a local restaurant) that provides a battery charging service and the DNNC associated with the remote outlet can detect the data tag, device ID, or authentication credentials (e.g., credentials stored on the device or received from the consumer) associated with the device, identify the consumer associated with the device based at least in part on the data tag, device ID or authentication credentials, and can bill the account of that consumer for power provided to the consumer's device by the outlet of that remote location, when in accordance with the predefined control criteria. Additionally or alternatively, a consumer can be required to provide payment (e.g., using credit, debit or gift card, cash) to the remote location in order to utilize the remote outlet of the remote location for charging the device.

It is to be appreciated and understood that, while not shown in FIG. 2, a CCN (e.g., 208, 210) can comprise an enhanced consumer meter (ECM) (e.g., smart meter or other meter comprising AMI) (not shown) that can track consumption of power by the CCN (and/or generation of power by a local PDS (e.g., 224) associated with the CCN) and can communicate information related to power usage or generation to the associated lower level DNNC component 216 via a specified communication channel and communication technology (e.g., wireless or wireline communication), in accordance with predefined communication channel selection criteria, to facilitate enabling the lower level DNNC component 216 to desirably control power distribution by the lower level PDS 206, and/or DNNC components higher up in the hierarchy to control power distribution of their respective portions of the EDN. Also, the CCN can comprise an intelligent climate control system (not shown) that can automatically control, or be employed to manually control, the climate conditions of the physical space of the CCN in response to control information received from the consumer or a DNNC (e.g., upper, mid, or lower DNNC received via the lower level DNNC).

Figure 3:
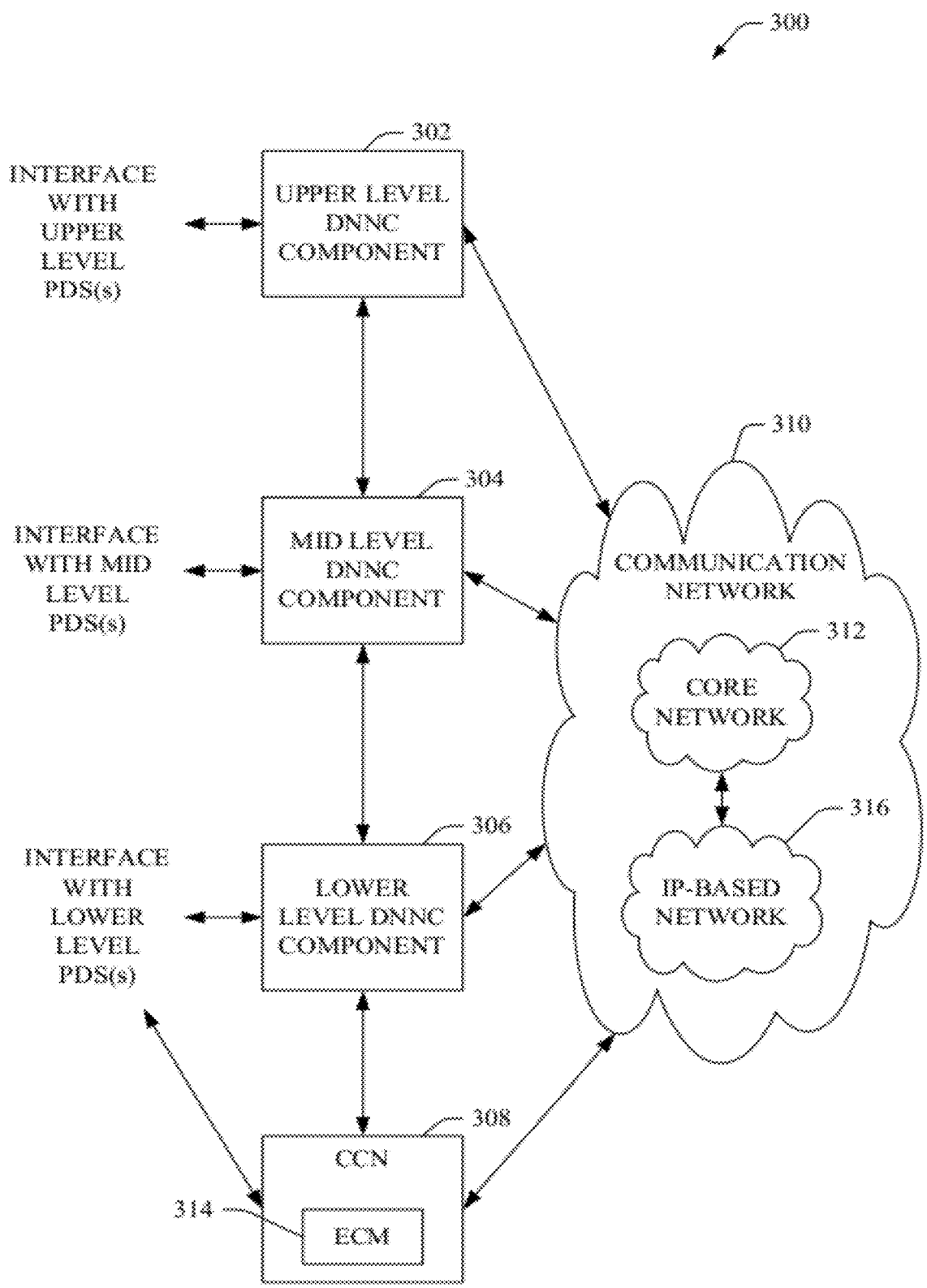
FIG. 3 illustrates a block diagram of an example system having a multi-tier hierarchical communication and control architecture for an EDN that is associated with a communication network in accordance with various aspects and embodiments of the disclosed subject matter.

FIG. 3 depicts a block diagram of an example system 300 having a multi-tier (e.g., three-tier) hierarchical communication and control architecture for an EDN that is associated with a communication network in accordance with various aspects and embodiments of the disclosed subject matter. The system 300 can include an upper level DNNC component 302, a mid level DNNC component 304, a lower level DNNC component 306, and a CCN 308, wherein each of these components can be the same or similar as, or can comprise the same or similar functionality as respective components (e.g., respectively named components), as disclosed herein. The upper level DNNC component 302, mid level DNNC component 304, and lower level DNNC component 306 can be respectively interfaced with an upper level PDS, a mid level PDS, and a lower level PDS, which are not shown for reasons of brevity and clarity.

In an aspect, the upper level DNNC component 302, mid level DNNC component 304, and lower level DNNC component 306 each can be associated with (e.g., connected to) a communication network 310 that can facilitate wired and wireless communication between the upper level DNNC component 302, mid level DNNC component 304, lower level DNNC component 306, and CCN 308, associated with the communication network 310. In accordance with various aspects and embodiments, the communication network 310 can comprise a core network 312 (e.g., mobile core network) that can be employed to facilitate communication by control nodes (e.g., DNNC components, ECM 314) associated (e.g., wirelessly connected) with the core network 312 and other control nodes associated with the communication network 310. The core network 312 can be associated with APs (e.g., macro or cellular AP, femto AP, pico AP) (not shown) to facilitate wireless communication of voice and data associated with control nodes, associated with the communication network 310. The core network 312 can facilitate routing voice and data communications between control nodes or other communication devices (e.g., computer, mobile phone (e.g., cellular phone, smart phone), personal digital assistant (PDA), electronic notepad, electronic netbook, electronic gaming device, another type of electronic device with communication capabilities, servers (e.g., email server, multimedia server, audio server, video server, news server, financial or stock information server), etc.) via the core network 312 or via an IP-based network 316 (e.g., Internet, intranet, etc.) associated with (e.g., included in or connected to) the communication network 310. The core network 312 also can allocate resources to the control nodes in the communication network 310, convert or enforce protocols (e.g., communication protocols), establish and enforce QoS for the control nodes or other devices, provide applications or services in the network, translate signals, and/or perform other desired functions to facilitate system interoperability and communication in the wireless communication network. The core network 312 further can include desired components, such as routers, nodes (e.g., serving general-packet-radio-service (GPRS) support node (SGSN), gateway GPRS support node (GGSN), etc.), switches, interfaces, controllers, etc., that can facilitate communication of data between control nodes or devices associated with the communication network 310. The communication network 310 also can include the IP-based network 316, which can be associated with the core network 312 and can facilitate communications by control nodes or devices associated with the communication network 310 at least in part via communication of data packets (e.g., IP-based data packets) between control nodes or devices that are associated with the communication network 310 using a wireline or wireless communication connection in accordance with specified IP protocols. In accordance with various embodiments, the control nodes can communicate with each other directly via a communication connection using a specified communication technology(ies) (e.g., PLC) associated with the transmission power lines to which the PDSs of the respective hierarchy levels and the CCN 308 are connected and/or indirectly via respective communication connections with the communication network 310 using the specified communication technology(ies) associated with the transmission power lines.

In accordance with various aspects and embodiments, the subject specification can be utilized in wireless, wired, and converged (e.g., wireless and wired) communication networks. For example, the disclosed subject matter can be employed in wireless networks, with such networks including, for example, 2G type networks, 3G type networks, 4G type networks, LTE, Universal Mobile Telecommunications Systems (UMTS), Code Division Multiple Access (CDMA) type systems, Wideband CDMA (WCDMA) type systems, etc.

Figure 4:
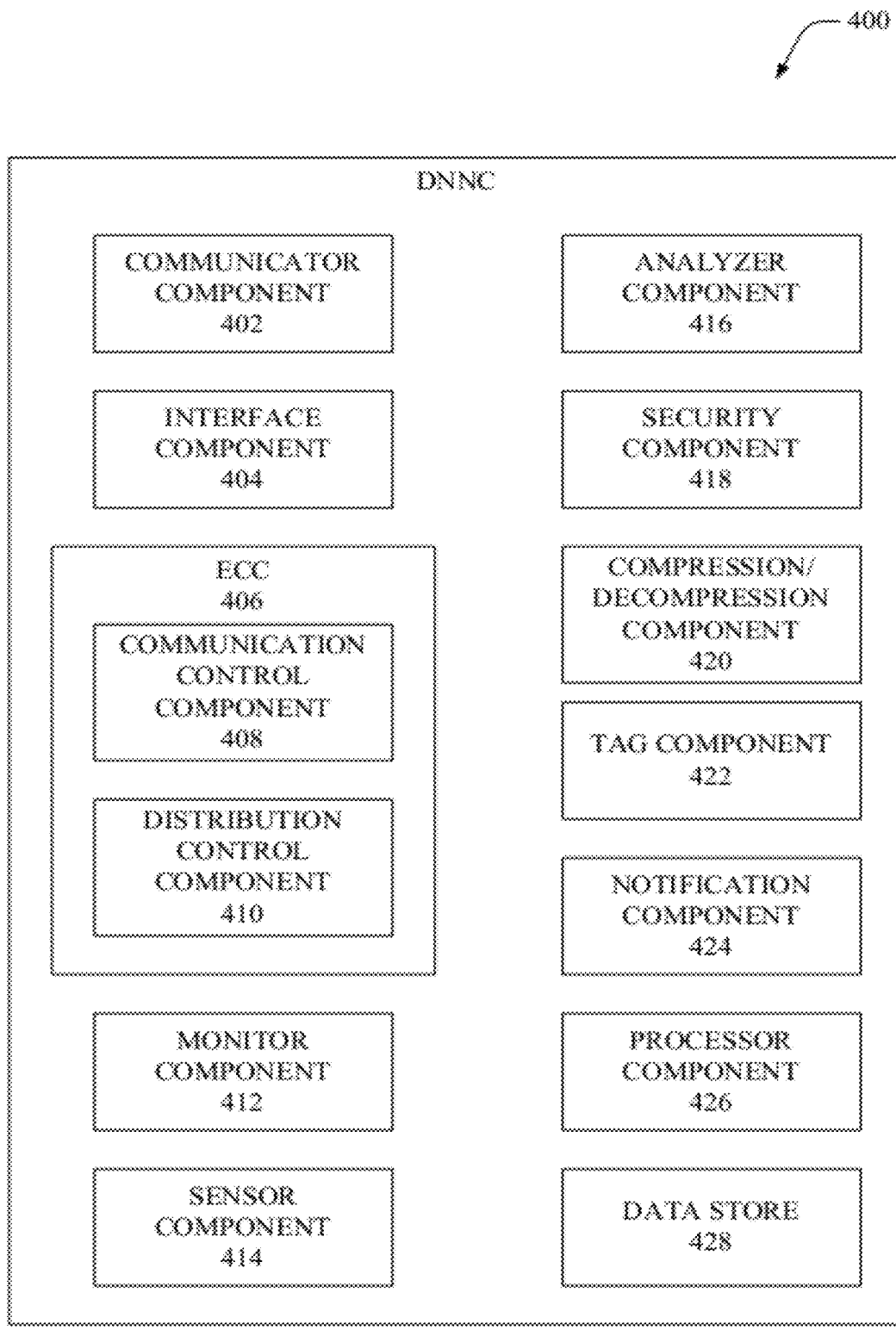
FIG. 4 depicts a block diagram of an example distribution network node controller (DNNC) component that can control data communications and power distribution in an EDN in accordance with various aspects and embodiments of the disclosed subject matter.

Referring to FIG. 4, depicted is a block diagram of an example DNNC component 400 that can control data communications and power distribution in an EDN in accordance with various aspects and embodiments of the disclosed subject matter. The DNNC component 400 can be employed in a desired hierarchy level of a multi-tier IDMS, wherein the exact implementation of the various aspects of the DNNC component 400 can be based at least in part on the particular hierarchy level in which the DNNC component 400 is implemented (e.g., the implementation of a DNNC component in one level of the hierarchy can be the same or different than the implementation of a DNNC component at another level of the hierarchy).

In an aspect, the DNNC component 400 can include a communicator component 402 that can enable the DNNC component 400 to communicate with other components (e.g., control or communication nodes, such as other DNNC components, ECMs, etc.) via a wired or wireless communication connection. The communicator component 402 can comprise a communication platform that can comprise electronic components and associated circuitry that can provide for processing and manipulation of a received signal(s) or signal(s) to be transmitted, for example, via a wireline or wireless communication connection. In accordance with various embodiments, the DNNC component 400 can be employed to facilitate wireless communication with other control nodes, and the communication platform can employ a set of antennas that can receive and transmit signal(s) from and to wireless devices like access points (APs), control nodes, access terminals, wireless ports and routers, and so forth, that operate in a radio access network. The communication platform of the communicator component 402 also can comprise electronic components and associated circuitry that provide for processing and manipulation of received signal(s) and signal(s) to be transmitted, such as, for example, receivers and transmitters, multiplexer/demultiplexer component, and a modulation/demodulation component. The communicator component 402 also can be configured to communicate via a wireline communication connection (e.g., DSL, BPL or other type of broadband connection, etc.).

The DNNC component 400 also can comprise an interface component 404 (also referred to herein as "I/F 404") that can include and/or provide various adapters, connectors, controls, channels, ports, communication paths, etc., to integrate the DNNC component 400 into virtually any EDN and enable the DNNC component 400 to interface with other control nodes in the EDN and interface with an associated PDS. In addition, I/F 404 can provide various adapters, connectors, controls, channels, ports, communication paths, etc., that can provide for interaction and/or communication with a processor component, and/or any other component (e.g., sensors) associated with the DNNC component 400.

In accordance with various other aspects, the DNNC component 400 can contain an ECC 406 that can control communications and power distribution, as more fully disclosed herein. The ECC 406 can include a communication control component 408 that can be employed to (e.g., automatically and dynamically) control the collection and communication of data between the DNNC component 400 and other control nodes, and (e.g., automatically and dynamically) control selection of communication channels and technology for use in communicating data to other control nodes, as more fully disclosed herein. The ECC 406 also can comprise a distribution control component 410 that can (e.g., automatically and dynamically) control distribution of power for the portion of the power grid controlled by the DNNC component 400 based at least in part on the availability of power for distribution, demands for power by the CCNs associated with the DNNC component 400, and the predefined control criteria. The predefined control criteria can comprise predefined power distribution criteria (and corresponding predefined power distribution rules) can relate to, for example, maximization of net consumption of power at the lower level of the hierarchy, minimization of requesting or demanding power be transferred from a higher level in the hierarchy to the lower level, maximum power that can be received by the PDS at a given time, maximum power that can be distributed at a given time by the PDS, maximum operating temperature of the PDS, power distribution control information or rules received from a higher level (e.g., higher level DNNC), available local power from local power sources in the lower level, expected or predicted future power demands in the lower tier, consumer agreements relating to power distribution for CCNs in the lower level, etc In still another aspect, the DNNC component 400 can contain a monitor component 412 that can monitor power conditions relating to the associated PDS and/or other power sources (e.g., local PDSs) connected to the portion of the power grid under the control of the DNNC component 400 to facilitate rendering decisions for controlling the distribution of power by the PDS. The monitor component 412 also can monitor communication conditions associated with the DNNC component 400 to facilitate selection of a desired communication channel and/or technology in accordance with the predefined communication channel selection criteria.

In yet another aspect, the DNNC component 400 can include a sensor component 414 that can that can comprise one or more sensors and/or can receive data, flags, indicators, etc., from one or more sensors, distributed throughout the EDN, or at least the portion of the EDN controlled by or otherwise associated with the DNNC component 400. The sensors can comprise, for example, sensors that can sense power-related conditions (e.g., sensors that measure the amount of power being distributed, fault sensors, heat sensors, anti-tamper sensors, etc.) and sensors that can sense communication-related conditions (e.g., sensors that can be used to measure signal strength, sensors that can be used to identify QoS or data communication rates of a communication channel, sensors that can detect faults, sensors that can detect availability of a communication channel, anti-tamper sensors, etc.). The sensors can be located on or near the associated PDS or on or near the DNNC component 400, on or near power lines associated with the PDS, on or near communication lines or channels associated with the DNNC component 400, etc. The sensors can include or can be associated with devices that can be employed to protect the EDN from faults or other identified problems in the EDN, wherein such devices can be, for example, a fault current limiter (FCL) that can limit the amount of fault current when a fault occurs in the associated portion of the EDN, or fault current controllers (FCC) that also can control the amount of fault current in response to a detected fault.

In an aspect, the DNNC component 400 can comprise an analyzer component 416 that can parse, analyze, and/or evaluate information, such as information relating to power distribution and/or communication conditions, to facilitate rendering decisions, performing calculations, determining or identifying parameters relating to power distribution or communications, and performing other functions, to facilitate controlling power distribution for the portion of the power grid associated with the DNNC component 400 and controlling communications associated with the DNNC component 400. The information can comprise, for example, data relating to power distribution, data relating to communications associated with the DNNC component 400, data obtained from sensors, metadata associated with the data, tag information (e.g., tag name or word that can be used to associate a piece of data with another piece of data, a component (e.g., CCN, PDS, DNNC component, sensor, etc.), a device (e.g., electric or hybrid vehicle), a location, etc.), etc.

In still another aspect, the DNNC component 400 can employ a security component 418 that can employ desired security protocols and standards to facilitate authenticating users or components associated with the EDN, encrypting data to be transmitted and decrypting received data (e.g., received encrypted data), and detecting or identifying breaches of security in the power grid (e.g., attempts to tamper with a PDS, DNNC component 400, or other component; unauthorized attempt to access data associated with the DNNC component 400, etc.), as more fully disclosed herein.

In an aspect, the DNNC component 400 can include a compression/decompression component 420 that can compress data to reduce the amount of data being transmitted from the DNNC component 400 to another component (e.g., another DNNC component, a CCN, a PDS) or stored in the data store 428 of the DNNC component 400, in accordance with a desired compression/decompression algorithm, as more fully disclosed herein. The compression/decompression component 420 also can decompress data, such as received data or data retrieved from the data store 428, to obtain all or at least a desired portion of the original data, in accordance with the desired compression/decompression algorithm.

In yet another aspect, the DNNC component 400 can comprise a tag component 422 that can tag a piece of data to associate the piece of data with another piece of data, a component (e.g., CCN, PDS, DNNC component, sensor, etc.), a device (e.g., electric or hybrid vehicle), a location, etc., wherein a mapping of the association with the tag can be stored in the data store 428 and/or provided to another component associated with the DNNC component 400. The tag component 422 also can be employed to identify tags and associated data in received pieces of data to facilitate desired processing of the data (e.g., identify a tag associated with an electric vehicle and/or associated owner of the vehicle to facilitate proper billing of the owner for charging the electric vehicle at a distribution point of the EDN that is outside of the owner's CCN).

In accordance with an aspect, the DNNC component 400 can contain a notification component 424 that can generate a notification, indicator, or flag relating to power distribution, such as a fault indicator or flag to indicate a fault or other problem at a specified point in the EDN or with regard to a component or power-related parameter, a notification regarding power conditions, etc., or relating to communication conditions, such as a fault indicator or flag to indicate a fault or other problem relating to communications at a specified point in the EDN or with regard to a component or communication-related parameter, a notification regarding communication conditions, etc. The DNNC component 400, employing the communicator component 402, can communicate the generated notification, flag, or indicator, or a message comprising information relating to the generated notification, flag, or indicator to a desired control node (e.g., a DNNC component associated with the DNNC component 400, a CCN, etc.) for evaluation and/or processing.

The DNNC component 400 also can comprise a processor component 426 that can operate in conjunction with the other components (e.g., communicator component 402, I/F component 404, ECC 406, etc.) of the DNNC component 400 to facilitate performing the various functions of the DNNC component 400. The processor component 426 can employ one or more processors, microprocessors, or controllers that can process data, such as information relating to power distribution and data communications, information (e.g., symbols, bits, or chips) for multiplexing/demultiplexing or modulation/demodulation such as implementing direct and inverse fast Fourier transforms, selection of modulation rates, selection of data packet formats, inter-packet times, etc., information relating to other operations of the DNNC component 400, and/or other information, etc., to facilitate operation of the DNNC component 400, as more fully disclosed herein, and control data flow between the DNNC component 400 and other components (e.g., PDS, another DNNC component, ECM, etc.) associated with the DNNC component 400.

The DNNC component 400 also can include a data store 428 that can store data structures (e.g., user data, metadata), code structure(s) (e.g., modules, objects, hashes, classes, procedures) or instructions, information relating to power distribution and data communications, network or device information like policies and specifications, attachment protocols, code sequences for scrambling, spreading and pilot (e.g., reference signal(s)) transmission, frequency offsets, control node IDs (e.g., communication device IDs), encoding algorithms, compression algorithms, decoding algorithms, decompression algorithms, information relating to other operations of the DNNC component 400, etc., to facilitate controlling operations associated with the DNNC component 400. In an aspect, the processor component 426 can be functionally coupled (e.g., through a memory bus) to the data store 428 in order to store and retrieve information desired to operate and/or confer functionality, at least in part, to the components of the DNNC component 400 (e.g., communicator component 402, I/F component 404, ECC 406, etc.), and/or substantially any other operational aspects of the DNNC component 400.

Figure 5:
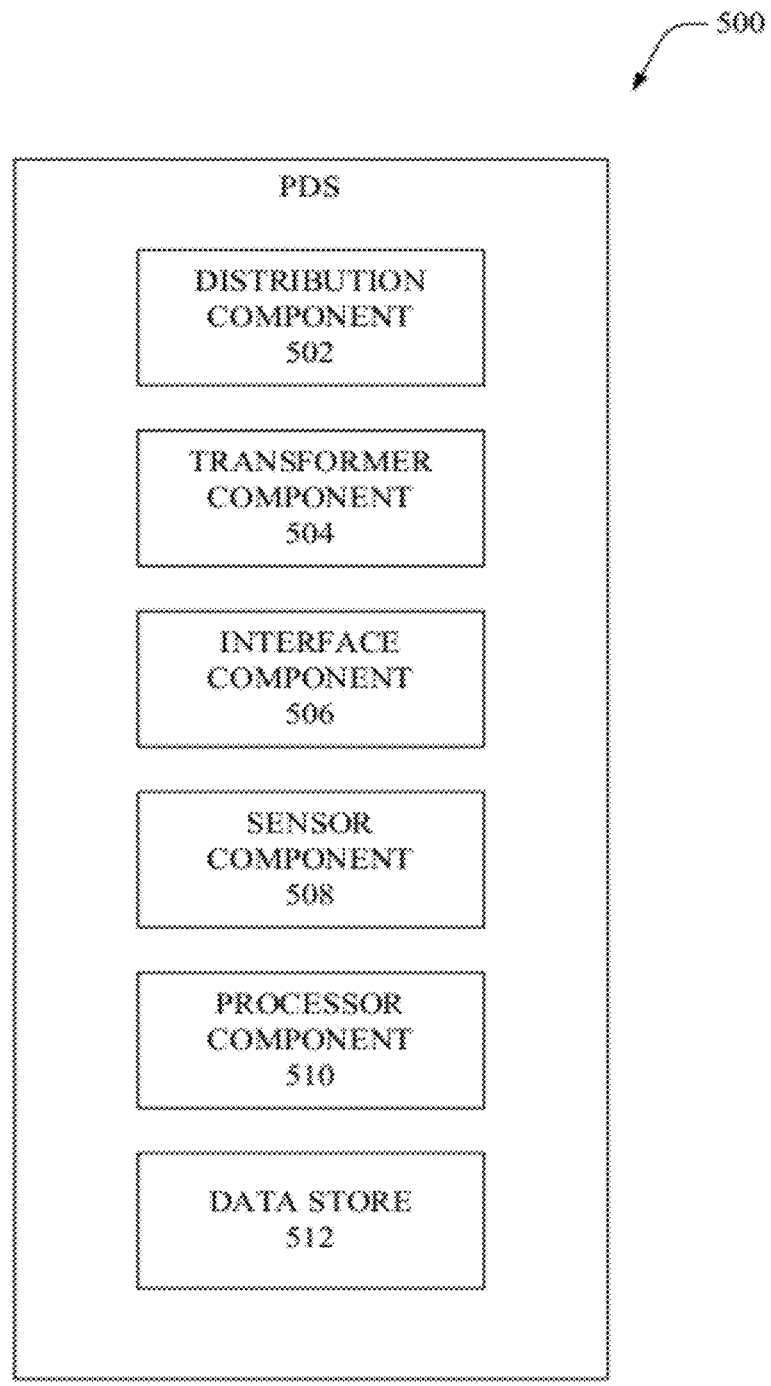
FIG. 5 illustrates a block diagram of an example power distribution source (PDS) in accordance with various aspects of the disclosed subject matter.

FIG. 5 illustrates a block diagram of an example PDS 500 in accordance with various aspects of the disclosed subject matter. In an aspect, the PDS 500 can include a distribution component 502 that can be employed to generate and/or distribute power to a PDS(s) or CCN(s) associated with the PDS 500. In accordance with various embodiments, the PDS 500 can be a power generation plant that generates and distributes power to one or more PDSs that are lower in the hierarchy, or a mid level PDS or low level PDS that distributes power received from a PDS that is higher up in the hierarchy in the EDN.

In another aspect, the PDS 500 can contain a transformer component 504 that can be used to convert voltage from a lower voltage level to a higher voltage level, or from a higher voltage level to a lower voltage level, depending on where the electric power is being distributed. For example, if the PDS 500 is an upper level PDS, such as a power generation plant, the PDS 500, using the transformer component 504, can convert the generated power voltage level to a higher voltage level to facilitate efficient transmission of the power to another PDS lower in the hierarchy and closer to the end point (e.g., CCN). As another example, the PDS 500 can be a lower level PDS that receives power having a higher voltage level from a PDS higher up in the hierarchy in the EDN, and the transformer component 504 can transform the higher voltage power to power having a lower voltage level that is suitable for the next destination (e.g., CCN) of the power.

In still another aspect, the PDS 500 can comprise an interface component 506 that can that can include and/or provide various adapters, connectors, controls, channels, ports, communication paths, etc., to integrate the PDS 500 into virtually any EDN and enable the PDS 500 to interface with other distribution nodes (e.g., PDSs) and control nodes (e.g., DNNC component), or consumer nodes (e.g., CCNs) in the EDN. In addition, I/F 506 can provide various adapters, connectors, controls, channels, ports, communication paths, etc., that can provide for interaction and/or communication with a processor component (e.g., 510), and/or any other component (e.g., sensor(s)) associated with the PDS 500.

In yet another aspect, the PDS 500 can include a sensor component 508 that can comprise one or more sensors that can be distributed at specified locations on, at or near the PDS 500. The respective sensors can comprise, for example, sensors that can sense power-related conditions (e.g., sensors that measure the amount of power being distributed, fault sensors, heat sensors, anti-tamper sensors, etc.) and sensors that can sense communication-related conditions relating to communications between the PDS 500 and an associated DNNC or another PDS. The sensors can be located, for example, on or near the PDS 500, on or near power lines associated with the PDS 500, etc. The sensor component 508 can generate signals, messages, notifications, flags, indicators, etc., that can be transmitted from the sensor component 508 to the associated DNNC component or other desired component for further processing, as more fully disclosed herein.

The PDS 500 also can comprise a processor component 510 that can operate in conjunction with the other components (e.g., distribution component 502, transformer component 504, interface component 506, sensor component 508, etc.) to facilitate performing the various functions of the PDS 500. The processor component 510 can employ one or more processors, microprocessors, or controllers that can process data, such as information relating to power distribution, information to facilitate interfacing the PDS 500 with an associated DNNC component, information relating to or obtained from sensors, information relating to other operations of the PDS 500, and/or other information, etc., to facilitate operation of the PDS 500, as more fully disclosed herein, and control data flow between the PDS 500 and other components (e.g., another PDS, a DNNC component, an ECM, etc.) associated with the PDS 500.

The PDS 500 also can include a data store 512 that can store data structures (e.g., user data, metadata), code structure(s) (e.g., modules, objects, hashes, classes, procedures) or instructions, information relating to power distribution, information to facilitate interfacing the PDS 500 with an associated DNNC component, information relating to or obtained from sensors, information relating to other operations of the PDS 500, etc., to facilitate controlling operations associated with the PDS 500. In an aspect, the processor component 510 can be functionally coupled (e.g., through a memory bus) to the data store 512 in order to store and retrieve information desired to operate and/or confer functionality, at least in part, to the components of the PDS 500 (e.g., distribution component 502, transformer component 504, interface component 506, sensor component 508, etc.), and/or substantially any other operational aspects of the PDS 500.

Figure 6:
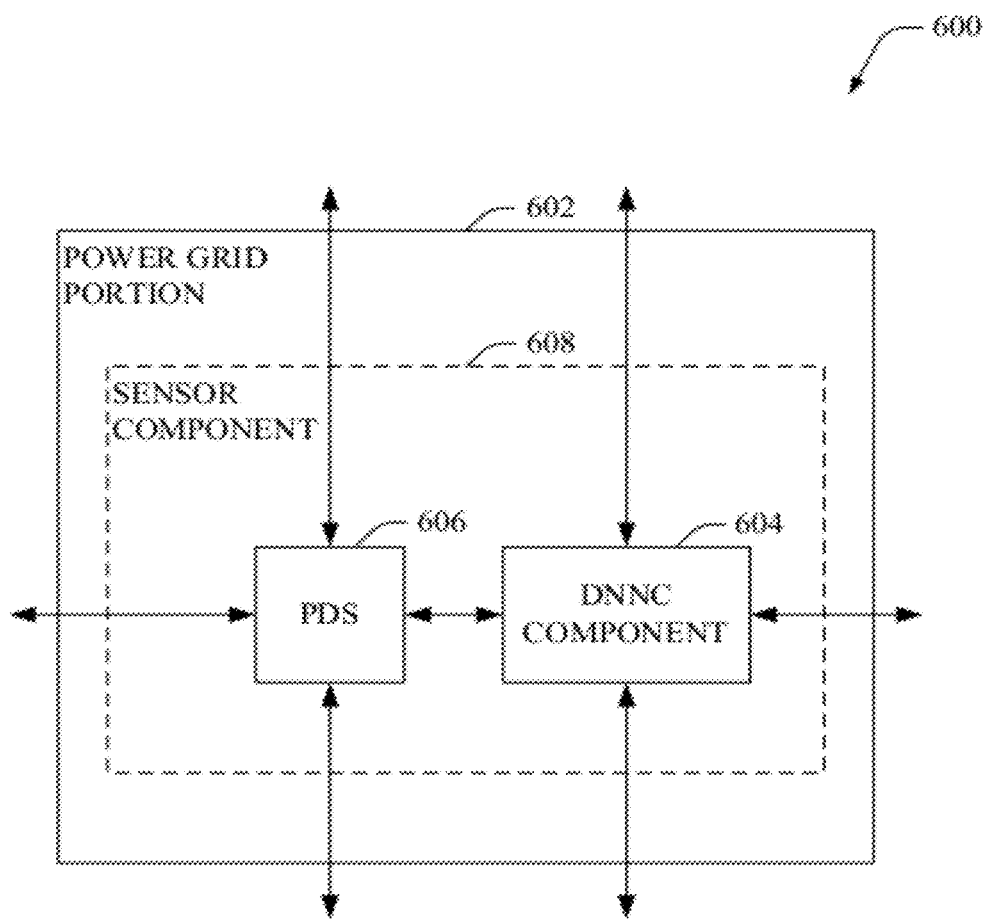
FIG. 6 depicts a block diagram of an example system that can employ sensors to facilitate controlling power distribution and communications in a portion of an EDN in accordance with various aspects and embodiments of the disclosed subject matter.

FIG. 6 depicts a block diagram of an example system 600 that can employ sensors to facilitate controlling power distribution and communications in a portion of an EDN in accordance with various aspects and embodiments of the disclosed subject matter. The system 600 can comprise a power grid portion 602 that can be part of a power grid of an EDN. In an aspect, the power grid portion 602 can include a DNNC component 604 that can control power distribution and communications, as more fully disclosed herein. In another aspect, the power grid portion 602 also can include a PDS 606 that can be associated with the DNNC component 604 and can control power distribution for the power grid portion 602.

In still another aspect, the system 600 can comprise a sensor component 608 that can comprise one or more sensors that can be distributed at specified locations throughout the power grid portion 602. In FIG. 6, the sensor component 608 is depicted as a dotted line and extending to encompass or surround all or portions of the other components (e.g., the DNNC component 604, PDS 606, lines (e.g., power lines, communication lines, etc.) associated therewith, and other portions of the power grid portion 602 to facilitate illustrating or indicating that the one or more sensors can be distributed throughout the power grid portion 602. The respective sensors can comprise, for example, sensors that can sense power-related conditions (e.g., sensors that measure the amount of power being distributed, fault sensors, heat sensors, anti-tamper sensors, etc.) and sensors that can sense communication-related conditions (e.g., sensors that can be used to measure signal strength, sensors that can be used to identify QoS or data communication rates of a communication channel, sensors that can detect faults, sensors that can detect availability of a communication channel, anti-tamper sensors, etc.). The sensors can be located, for example, on or near the associated PDS 606 or on or near the DNNC component 604, on or near power lines associated with the PDS 606, on or near communication lines or channels associated with the DNNC component 604, etc. The sensor component 608 can generate signals, messages, notifications, flags, indicators, etc., that can be transmitted from the sensor component 608 to the DNNC component 604 or other desired component (e.g., PDS 606) for further processing, as more fully disclosed herein.

In accordance with an embodiment of the disclosed subject matter, a design platform (not shown), for example, comprising an application programming interface(s) (API) (not shown), can be employed to enable application developers to develop additional controls that can be employed to facilitate controlling data communication and power distribution in the EDN. For instance, an API can be utilized to create one or more desired custom controls that can be employed to facilitate data communication control or power distribution control for a particular level in the multi-tier hierarchy of the IDMS, wherein the custom control(s) created using an API can be made available for implementation in the EDN via a desired format, such as a saved or downloadable file, CD-ROM, DVD-ROM, memory stick (e.g., flash memory stick), floppy disk, etc.

In accordance with another embodiment of the disclosed subject matter, one or more components (e.g., DNNC component, ECM, etc.) in the communication network environment can utilize artificial intelligence (AI) techniques or methods to infer (e.g., reason and draw a conclusion based at least in part on a set of metrics, arguments, or known outcomes in controlled scenarios) an automated response to perform in response to an inference(s); an amount or a type of data that is to be included in a data communication between DNNC components; a control parameter value relating to power distribution or data communications; a communication channel or technology to utilize to communicate data between DNNC components; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with the systems and methods disclosed herein to facilitate rendering an inference(s) related to the systems and methods disclosed herein.

In particular, the one or more components in the communication network environment can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing techniques or methods can be applied to analysis of the historic and/or current data associated with systems and methods disclosed herein to facilitate making inferences or determinations related to systems and methods disclosed herein.

The aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

In view of the example systems and/or devices described herein, example methodologies that can be implemented in accordance with the disclosed subject matter can be better appreciated with reference to flowcharts in FIGS. 7-10. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a method disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a method in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 7:
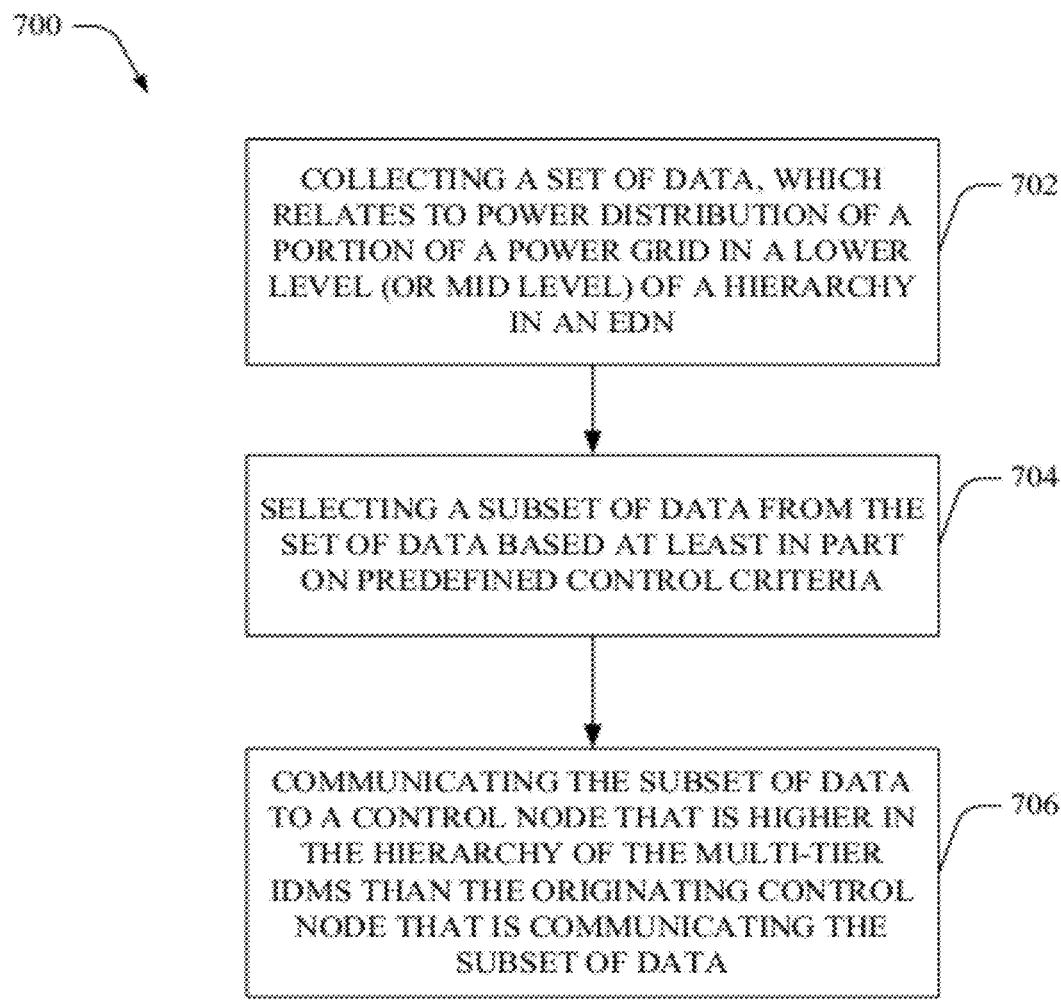
FIG. 7 illustrates a diagram of a flowchart of an example method that can select a subset of data from a set of data for communication to a control node higher in the hierarchy of a multi-tier integrated distribution management system (IDMS) in an EDN in accordance with various aspects and embodiments of the disclosed subject matter.

FIG. 7 illustrates a diagram of a flowchart of an example method 700 that can select a subset of data from a set of data for communication to a control node higher in the hierarchy of a multi-tier IDMS in an EDN in accordance with various aspects and embodiments of the disclosed subject matter. At 702, a set of data, which relates to power distribution of a portion of a power grid in a lower level (or mid level) of a hierarchy in an EDN, can be collected. For example, a lower level DNNC component can collect a set of data relating to power distribution for the portion of the power grid in the lower level of the hierarchy of the multi-tier IDMS, wherein the set of data can comprise data obtained from the lower level DNNC component from an associated PDS(s) or CCN(s), data comprising results of data evaluation or calculations performed by the lower level DNNC component, data obtained from sensors, etc.

At 704, a subset of data can be selected from the set of data based at least in part on predefined control criteria. The predefined control criteria can comprise predefined data selection criteria that can relate to, for example, the destination control node (e.g., mid level DNNC component, upper level DNNC component) of the subset of data, type of data (e.g., type of parameter, type of indicator, etc.) or amount of data desired by the destination control node, priority of data, data available in the set of data, respective hierarchy levels of the originating and destination control nodes, current communication conditions, etc. In accordance with the predefined data selection criteria (and application of corresponding predefined data selection rules), a subset of data, which can comprise all or a desired lesser portion of the set of data, can be selected for communication to the control node that is higher (e.g., at the next higher tier or level) in the hierarchy than the originating control node (e.g., lower level (or mid level) DNNC component) that is sending the subset of data.

At 706, the subset of data can be communicated to a control node that is higher in the hierarchy of the multi-tier IDMS than the originating control node (e.g., lower level (or mid level) DNNC component) that is communicating the subset of data. For example, if the originating control node is a lower level DNNC component, it can transmit the subset of data to the control node (e.g., mid level DNNC component or upper level DNNC component) that is higher (e.g., at the next highest level) in the hierarchy than the originating control node; or if the originating control node is a mid level DNNC component, it can transmit the subset of data to the control node (e.g., higher-up mid level DNNC component or upper level DNNC component) that is higher (e.g., at the next highest level) in the hierarchy than the originating control node.

Figure 8:
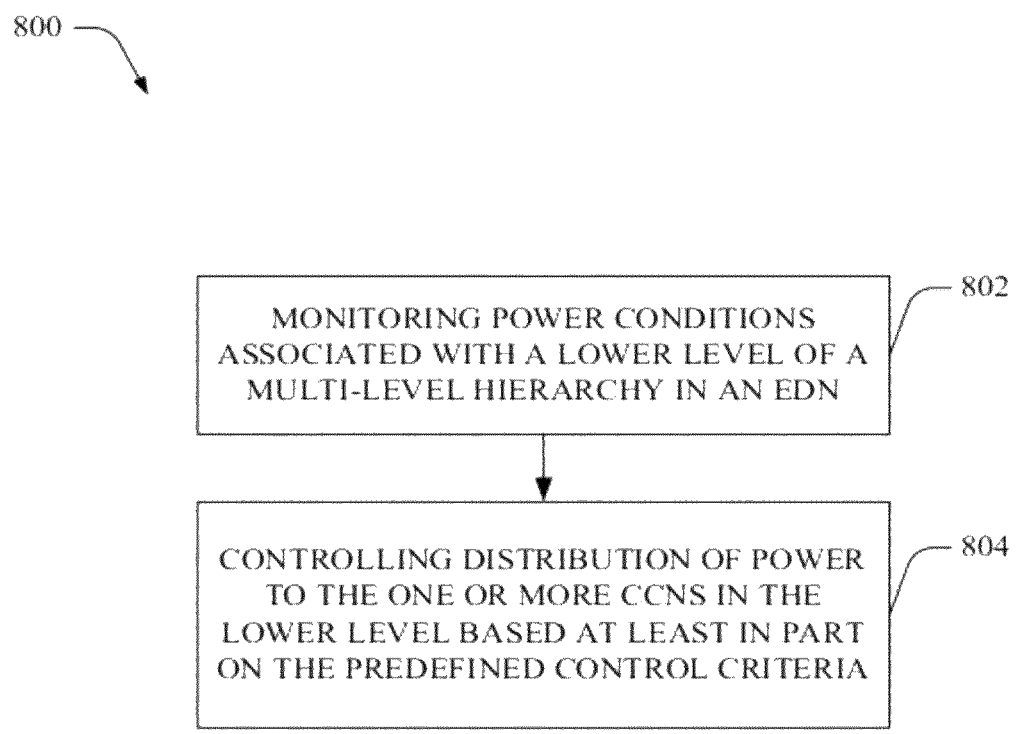
FIG. 8 depicts a diagram of a flowchart of an example method that can desirably control power distribution in a lower level of a multi-level IDMS in an EDN in accordance with various aspects and embodiments of the disclosed subject matter.

FIG. 8 illustrates a diagram of a flowchart of an example method 800 that can desirably (e.g., efficiently) control power distribution in a lower (e.g., lowest) level of a multi-level IDMS in an EDN in accordance with various aspects and embodiments of the disclosed subject matter. At 802, power conditions associated with a lower level of a multi-level hierarchy in an EDN can be monitored. In an aspect, a lower level DNNC can monitor components, such as one or more lower level PDSs and one or more CCNs, in a lower level (e.g., lower tier) of the multi-level hierarchy in the EDN, wherein there can be one or more DNNCs that are superior to the lower level DNNC in one or more higher levels (e.g., mid level, upper (e.g., highest or top) level) of the multi-level hierarchy of the EDN. The lower level DNNC can monitor overall power conditions of the lower level, including power conditions associated with a PDS that such DNNC controls and respective power conditions associated with the CCNs controlled by the lower level DNNC, to facilitate making decisions regarding the distribution of power by the PDS to the CCNs, the power needs of the CCNs, the transfer of power from a local power source in the lower level to a CCN in the lower level, the amount of power (if any) to request from the next highest level in the multi-level hierarchy, etc.

At 804, distribution of power to the one or more CCNs in the lower level can be controlled based at least in part on the predefined control criteria. The predefined control criteria can comprise predefined power distribution criteria (and corresponding predefined power distribution rules) that can relate to, for example, maximization of net consumption of power at the lower level of the hierarchy, minimization of requesting or demanding power be transferred from a higher level in the hierarchy to the lower level, maximum power that can be received by the PDS at a given time, maximum power that can be distributed at a given time by the PDS, maximum operating temperature of the PDS, power distribution control information or rules received from a higher level (e.g., higher level DNNC), available local power from local power sources in the lower level, expected or predicted future power demands in the lower tier, consumer agreements relating to power distribution for CCNs in the lower level, etc. For instance, the lower level DNNC can control the distribution of power to the one or more CCNs in the lower level of the hierarchy using power available (e.g., power available from local power sources) at the lower level such that the transfer of power from a higher level in the multi-level hierarchy to the lower level (e.g., via the lower level PDS) is minimized and net consumption of power at the lower level is maximized. As another example, the lower level DNNC can control scheduling of distribution of power to the one or more CCNs to facilitate protecting assets (e.g., the lower level PDS), for example, when the one or more CCNs (e.g., multiple CCNs having electric or hybrid vehicles being plugged in at the same time) attempt to simultaneously demand more power than the PDS is able to provide due in part to system constraints (e.g., maximum amount of power that the distribution transformer can handle). In such instance, the lower level DNNC can control the scheduling of power, for example, by alternating the distribution of power to the CCNs (e.g., supply power to the first CCN for a short period of time, followed by supplying power to the second CCN for a short period of time, etc., in a revolving fashion), or providing power to one CCN until its power needs are met and then a next CCN until its power needs are met, etc., until the CCNs are requiring a lower amount of power that can be provided by the lower level PDS (or higher up PDSs) and/or the lower level DNNC can send a notification or request to one or more CCNs requesting that such CCNs reduce their demands for power (e.g., in exchange for an incentive and/or in accordance with an agreement between the power provider and the consumer), in accordance with the predefined power distribution criteria.

Figure 9:
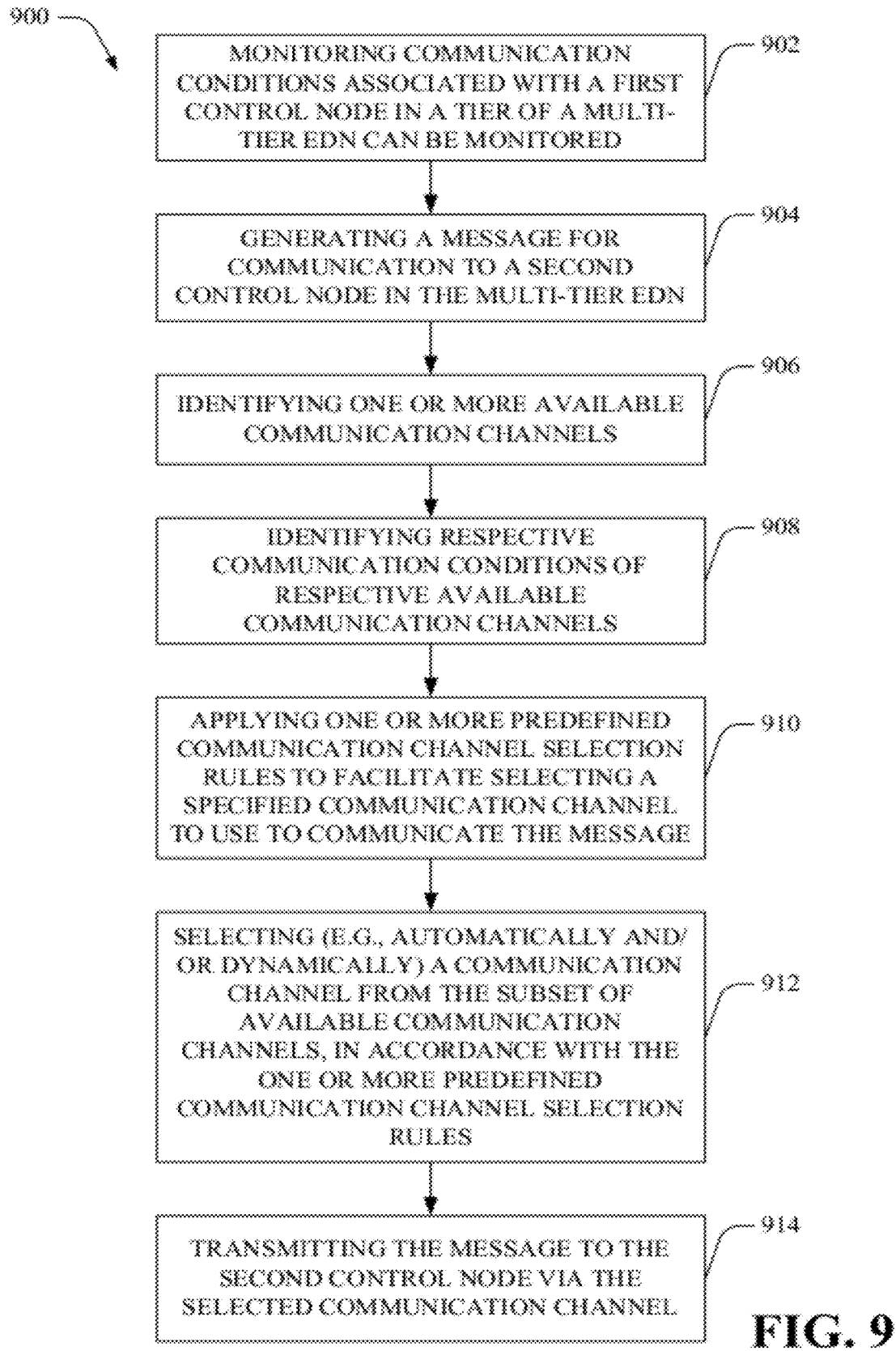
FIG. 9 illustrates a diagram of a flowchart of an example method that can select a desired communication channel and/or communication technology in accordance with various aspects and embodiments of the disclosed subject matter.

FIG. 9 illustrates a diagram of a flowchart of an example method 900 that can (e.g., automatically or dynamically) select a desired communication channel and/or communication technology in accordance with various aspects and embodiments of the disclosed subject matter. At 902, communication conditions associated with a first control node (e.g., DNNC) in a tier of a multi-tier EDN can be monitored.

At 904, a message can be generated for communication to a second control node in the multi-tier EDN. The second control node can be located in a tier above, in a tier below, or on the same tier as the first control node. The message can comprise data relating to power conditions, communications, or other desired data, wherein a subset of data can be selected to be included in the message in accordance with the predefined data selection criteria (and corresponding rules), as more fully disclosed herein.

At 906, one or more available communication channels can be identified. The first control node can identify one or more communication channels that are available for use to communicate the message to the second control node, wherein the available communication channels can be a wireline communication channel(s) and/or a wireless communication channel(s).

At 908, respective communication conditions of respective available communication channels can be identified. For example, current data communication rates, communication channel or communication network congestion, QoS, or other communication factors of the respective available communication channels can be identified and evaluated. The first control node also can identify and evaluate other criteria, such as relative costs of sending the message via one communication channel over another communication channel, amount of data in the message, type of data in the message, and/or priority of the message, for example.

At 910, one or more predefined communication channel selection rules can be applied to facilitate selecting a specified communication channel to use to communicate the message. The one or more predefined communication channel selection rules can be created and implemented in accordance with the predefined communication channel selection criteria, as more fully disclosed herein. These rules can be applied to the information relating to respective communication conditions of the available communication channels, respective costs associated with the communication channels, message priority, etc., to facilitate identifying a desired (e.g., optimal) communication channel to use for sending the message.

At 912, a communication channel can be selected (e.g., automatically and/or dynamically) from the subset of available communication channels, in accordance with the one or more predefined communication channel selection rules. For instance, the communication channel of the subset of available communication channels that is identified as the desired communication channel, in accordance with the one or more predefined communication channel selection rules, can be selected. At 914, the message can be transmitted to the second control node via the selected communication channel.

Figure 10:
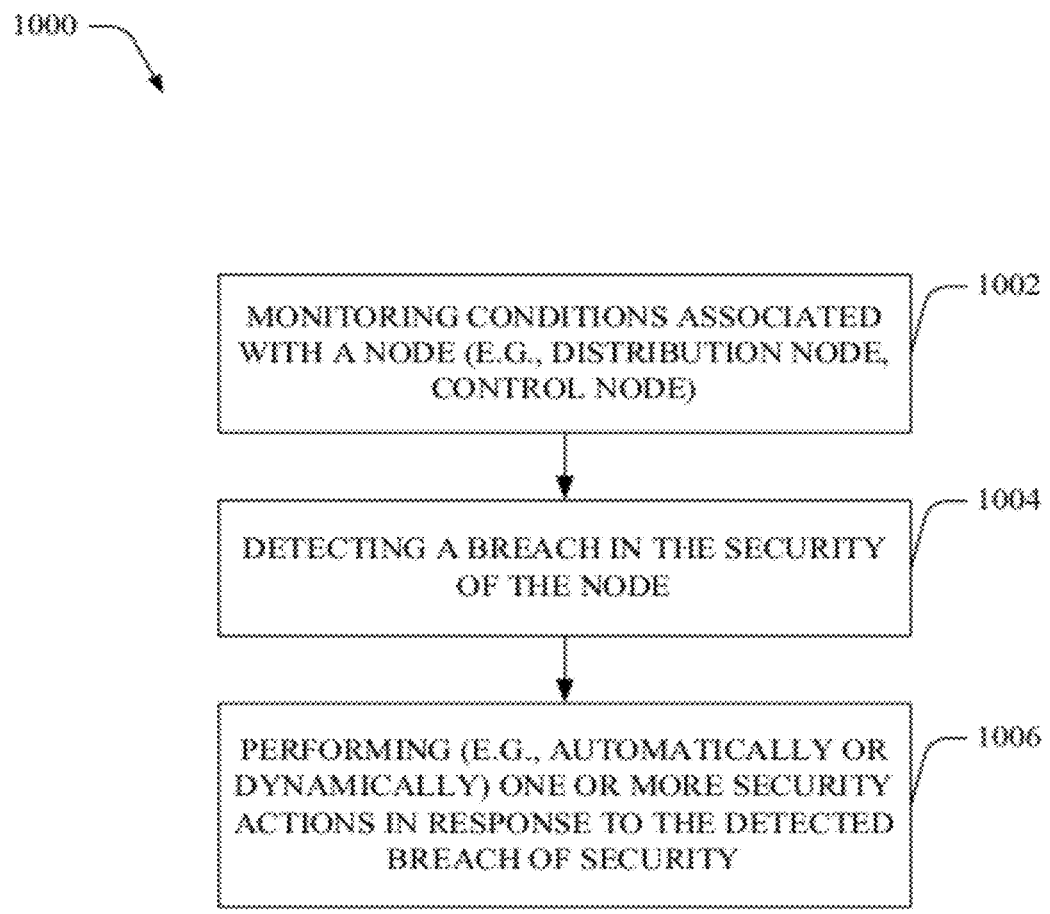
FIG. 10 presents a flowchart of an example method that can facilitate securing a node in the EDN in accordance with various aspects and embodiments of the disclosed subject matter.

FIG. 10 presents a flowchart of an example method 1000 that can facilitate securing a node (e.g., distribution node, such as a PDS; control node, such as a DNNC component) in the EDN in accordance with various aspects and embodiments of the disclosed subject matter. At 1002, conditions associated with the node (e.g., integrity of the node, security of data associated with the node, etc.) can be monitored. At 1004, a breach in the security of the node can be detected. For example, one or more sensors associated with the node can detect or identify a breach in the security of the node, wherein the breach in security can include, for example, an unauthorized attempt to access the node (e.g., unauthorized attempt to physically break into the casing of the node, unauthorized attempt to electronically gain access to the node), an unauthorized attempt to access to or obtain data from the node (e.g., side-channel attack, such as timing attack, electromagnetic attack, power monitoring attack, acoustic cryptanalysis attack, cache attack, differential fault analysis attack, etc.; brute-force attack; etc.), an unauthorized attempt to remove the node from its location, an unauthorized attempt to introduce a computer virus or malware into the node, an unauthorized attempt to disconnect a sensor from the node, an unauthorized attempt to otherwise breach the integrity of the node (e.g., attempt to subject the node to undesired temperature extremes in order to overcome security measures or disable the node), etc.

At 1006, one or more security actions can be performed (e.g., automatically or dynamically) in response to the detected breach of security. For example, depending at least in part on the type of breach detected, one or more security actions can be performed (e.g., by the security component) in response to the detected breach. The one or more security actions can include, for example, generate and send a notification of the security breach to a desired destination (e.g., upper level DNNC component, law enforcement or other government agency, such as Homeland Security), isolate the node from other nodes in the EDN so that breach in security can be isolated to that node and/or re-routing of power and/or data to another node(s) until further instruction, shut down the node, erase or destroy all or a desired portion of the data and/or storage device so that the data cannot be obtained by the attacker, initiate catastrophic or graceful failure of one or more components of the node, obtain evidence (e.g., photograph, IP address, location, etc.) relating to the breach in security including evidence relating to the node and/or the entity (e.g., person, computer, etc.) attacking the node, etc.

Figure 11:
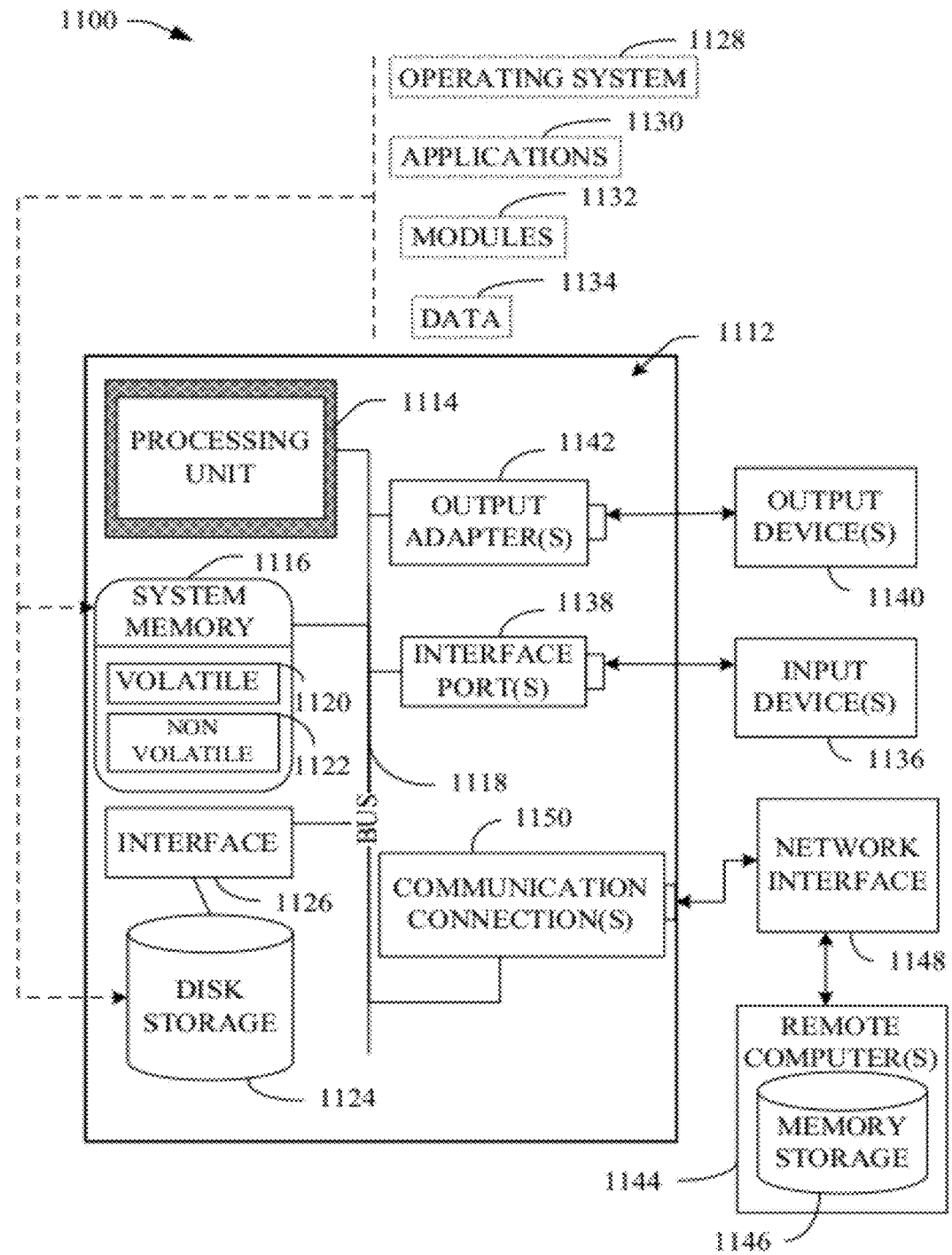
FIG. 11 is a schematic block diagram illustrating a suitable operating environment.
Figure 12:
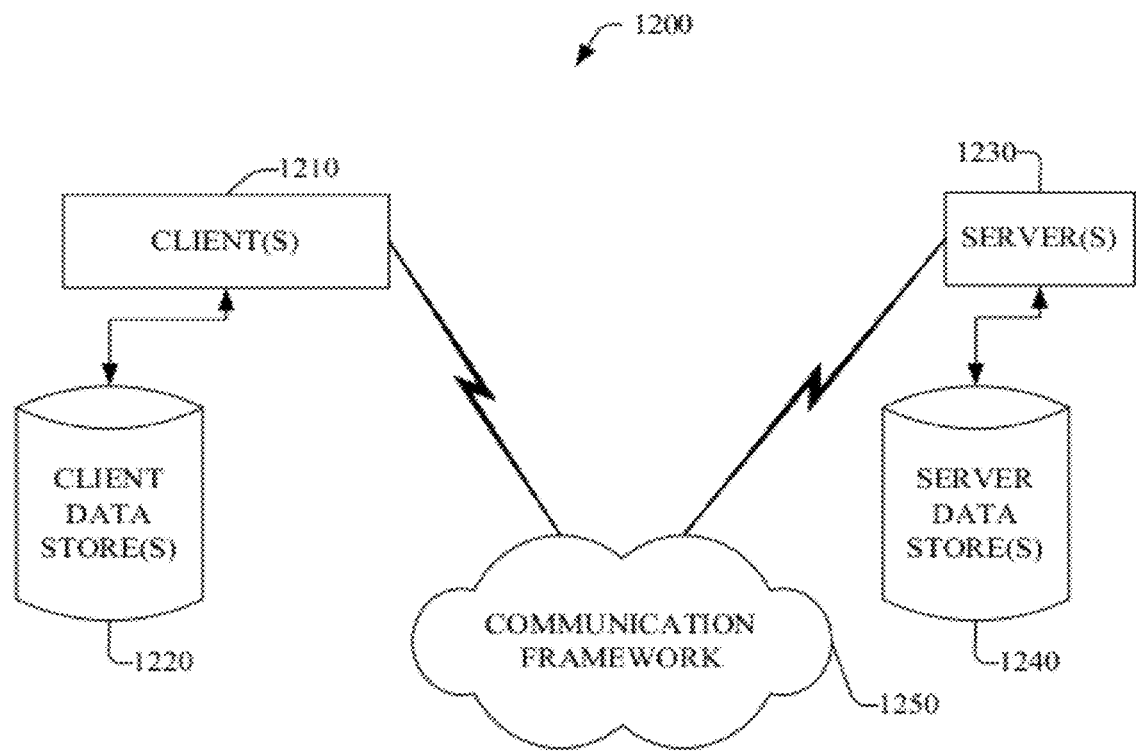
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the disclosed subject matter also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the disclosed subject matter can be practiced on stand-alone computers. In a distributed computing environment, program modules may be located in both local and remote memory storage devices.

With reference to FIG. 11, a suitable environment 1100 for implementing various aspects of the disclosed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/nonvolatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 is a schematic block diagram of a sample-computing environment 1200 with which the subject specification can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the disclosed subject matter, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1220 that can be employed to store information local to the client(s) 1210. Similarly, the server(s) 1230 are operatively connected to one or more server data store(s) 1240 that can be employed to store information local to the servers 1230.

Figure 13:
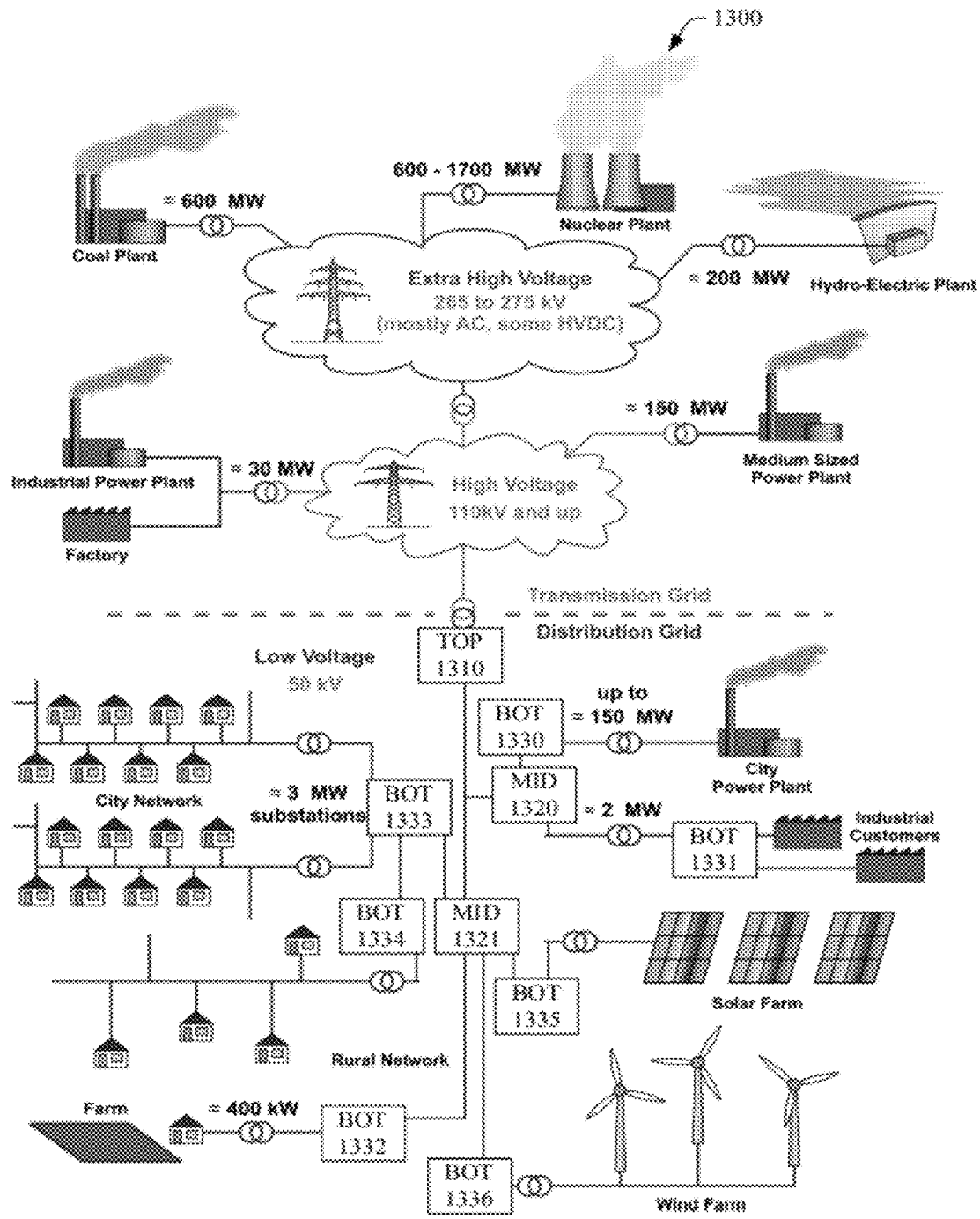
FIG. 13 depicts a diagram of an example electrical grid environment in which the various aspects of the disclosed subject matter can be practiced.

FIG. 13 depicts a diagram of an example electrical grid environment 1300 in which the various aspects of the disclosed subject matter can be practiced. It is to be appreciated that this figure and the associated disclosure is presented as a non-limiting example to facilitate a general comprehension of one or more aspects of the disclosed subject matter in connection with hypothetical electrical grid assets. Further, while sample values and assets are illustrated for context, these same sample values and assets are non-limiting and should not be viewed as defining any narrowing of scope. Generally, the assets of FIG. 13 can be assigned to a transmission grid portion (upper portion of figure) or a distribution grid portion (lower portion of figure) as is typical in many electrical power grids worldwide. Transmission systems often are associated with very high AC voltages or even DC transmission of power. Transmission systems are generally presented in the context of delivering high power to regional distribution networks managed by a distribution grid entity.

The conventional electrical distribution grid, as disclosed herein, generally has a flat control structure with control being centralized in a distribution control center (DCC). In contrast, as illustrated in FIG. 13, a non-flat control topography can be employed in accord with the subject matter disclosed herein. In this non-limiting example, three tiers of electrical distribution control system components are illustrated. A top-level (e.g., upper level) DNNC component 1310 (TOP 1310) can be communicatively coupled to junior level DNNC components (e.g., BOT 1320 to BOT 1336). In FIG. 13, the interconnections illustrate a basic tree structure topology.

In an aspect, two mid-level DNNC components 1320 (MID 1320) and 1321 (MID 1321) are logically placed between the bottom-level (e.g., lower level) DNNC components and the top-level DNNC component 1310. Further, the several bottom-level DNNC components (e.g., 1330 to 1336) can be associated with various edge assets. For example, bottom-level DNNC component 1330 can be associated with a city power plant and bottom-level DNNC component 1331 can be associated with a small group of industrial customers. Bottom-level DNNC component 1330 and 1331 can be logically connected to top-level DNNC component 1310 by way of mid-level DNNC component 1320. As such, data and rules can be bubbled up (e.g., communicated upward in the hierarchy) or pushed down (e.g., communicated downward in the hierarchy) by way of this path. The bidirectional communication and closed loop control at each level (e.g., top, mid, and bottom) can facilitate improved electrical distribution grid performance. For example, where additional power is needed by the industrial customers associated with bottom-level DNNC component 1331, control signals from mid-level DNNC component 1320 can source more power from city power plant by way of bottom-level DNNC component 1330 without directly involving the top-level DNNC component 1310 or draining energy from the illustrated solar farm or wind farm.

Similarly, mid-level DNNC component 1321 can be associated with bottom-level DNNC components 1332 to 1336. Bottom-level DNNC component 1333, for example, can be logically associated with a plurality of transformers service a portion of a city network. Further, for example, bottom-level DNNC component 1334 can be associated with a single transformer as part of a rural network. Moreover, at bottom-level DNNC component 1332, for example, the DNNC component can be associated with a single consumer, such as the farm. DNNC components also can be associated with distributed power generation, for example bottom-level DNNC component 1335 associated with a solar farm and bottom-level DNNC component 1336 associated with a wind farm. As such, bidirectional communication between top-level DNNC component 1310 and bottom-level DNNC components 1332-1336 can be by way of mid-level DNNC component 1321. As such, rules propagated for mid-level DNNC component 1320 and associate child DNNC components can be different from rules propagated for mid-level DNNC component 1321 and associated child DNNC components. Further, independent closed loop control can be affected, for example, at bottom-level DNNC component 1334 and the associated rural customers without impacting bottom-level DNNC component 1333 and the associated city network.

It is to be appreciated and understood that components (e.g., DNNC, PDS, sensor component, ECC, etc.), as described with regard to a particular system or method, can include the same or similar functionality as respective components (e.g., respectively named components or similarly named components) as described with regard to other systems or methods disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM)). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory (e.g., card, stick, key drive . . . ) or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

What has been described above includes examples of systems and methods that provide advantages of the disclosed subject matter. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
   a first power distribution node that is configured to distribute first power to a set of consumer consumption nodes (CCNs), wherein the first power distribution node and the set of CCNs are located in a lower tier in a multi-tier electrical distribution network (EDN), wherein the lower tier is lower in the multi-tier EDN than a higher tier in the multi-tier EDN, and wherein the first power distribution node comprises a distribution transformer; and a first node controller component that is configured to be interfaced with the first power distribution node, control the distribution of the first power by the first power distribution node to the set of CCNs, and control communication of data between the first node controller component and at least one other node controller component, in accordance with at least one defined control criterion, wherein the at least one other node controller component comprises a second node controller component that is interfaced with a second power distribution node comprising a power sub-station, the second node controller component and the second power distribution node are located in the higher tier of the multi-tier EDN, wherein the first node controller component is further configured to determine a first communication channel from a set of communication channels to use to communicate a subset of the data to the second node controller component, based at least in part on respective communication conditions of respective communication channels of the set of communication channels, a priority level associated with communication of the subset of the data to the second node controller component to enable control of power distribution by the power sub-station, and at least one defined control criterion relating to a communication channel determination for inter-tier data communications, wherein the first node controller component is further configured to determine that communication of the subset of the data to the second node controller component via the first communication channel has a higher cost than communication of the subset of the data to the second node controller component via a second communication channel of the set of communication channels, and determines the subset of the data is to be communicated to the second node controller component via the first communication channel instead of the second communication channel, even though the communication of the subset of the data via the first communication channel results in the higher cost, based at least in part on the priority level associated with the communication of the subset of the data being determined to satisfy a defined priority threshold level that indicates the higher cost is to be incurred, wherein the first node controller component is further configured to determine whether an amount of power collectively requested by the set of CCNs at a given time exceeds a defined amount of power that the first power distribution node is able to supply and, in response to determining the amount of the power collectively requested by the set of CCNs at the given time exceeds the defined amount of power, allocate respective amounts of power to respective CCNs of the set of CCNs to enable the defined amount of power to not be exceeded to enable the control of the distribution of the first power in the lower tier, and wherein, in response to detecting a power interruption in supplying second power to the first power distribution node by the second power distribution node located in the higher tier of the multi-tier EDN, the first node controller component is further configured to:
determine whether third power is available from a local power distribution source of a CCN of the set of CCNs, and
in response to determining the third power is available from the local power distribution source of the CCN, allocate the third power to one or more other CCNs of the set of CCNs based at least in part on respective priority levels of the respective CCNs of the set of CCNs.

2. The system of claim 1, wherein the first node controller component is further configured to collect a first portion of a set of the data from at least one CCN of the set of CCNs, the first power distribution node or at least one sensor in the lower tier, analyze at least the first portion of the set of the data resulting in analysis data that is a second portion of the set of the data, and control the distribution of the first power to the set of CCNs based at least in part on the set of the data.

3. The system of claim 2, wherein the first node controller component is further configured to comprise at least one custom control component that calculates an average value or a mean value of a power-condition-related parameter associated with the first power distribution node over a defined number of sample values of the power-condition-related parameter, determines the subset of the data, comprising the average value or the mean value of the power-condition-related parameter, from the set of the data based at least in part on the at least one defined control criterion that comprises a defined data selection criterion relating to selection of data usable by the second node controller component to enable control of power distribution for the higher tier and the lower tier, and communicate the subset of the data to the second node controller component, wherein the set of the data comprises the subset of the data and a second subset of the data, and the second subset of the data is not communicated to the second node controller component in accordance with the defined data selection criterion, and wherein an application programming interface is utilized to create the at least one custom control component to facilitate data communication control and the control of the power distribution in the multi-tier EDN.

4. The system of claim 3, wherein the first node controller component is further configured to filter the set of the data to enable the determination of the subset of the data to facilitate control of an amount of the data communicated in the multi-tier EDN and control of the distribution of the first power to the set of CCNs or distribution of the second power associated with the higher tier in the multi-tier EDN, wherein the subset of the data is determined to be usable to enable the control of the power distribution for the higher tier and the lower tier, in accordance with the defined data selection criterion, and the second subset of the data is determined to not satisfy the defined data selection criterion.

5. The system of claim 1, wherein the set of communication channels comprises a wireless communication channel and a wireline communication channel, and wherein the first node controller component associated with the distribution transformer is further configured to determine whether to communicate the subset of the data to the second node controller component associated with the power sub-station via the wireless communication channel or the wireline communication channel based at least in part on the priority level of the subset of the data and a quality-of-service level associated with the wireless communication channel, in accordance with the at least one defined control criterion.

6. The system of claim 5, wherein the set of communication channels comprises at least one of a digital subscriber line (DSL)-type communication channel, a cable communication channel, an Ethernet-type channel, a broadband-type communication channel, a Broadband over Power Lines (BPL) communication channel, a power line carrier (PLC) communication channel, a distribution line carrier (DLC) communication channel, a cellular communication channel, a communication channel based at least in part on an Institute of Electrical and Electronics Engineers (IEEE) 802.11-type protocol, a communication channel based at least in part on an IEEE 802.16-type protocol, a Worldwide Interoperability for Microwave Access (WiMax)-type communication channel, a femtocell communication channel, or a satellite communication channel.

7. The system of claim 1, wherein the set of CCNs comprises a first CCN and a second CCN, and wherein the first node controller component is further configured to control the first power distribution node to receive a portion of the first power from the first CCN and transfer the portion of the first power to the CCN, without involvement of the second power distribution node, to supply at least some power to be used by the second CCN to enable a reduction of transfer of the second power from the second power distribution node of the higher tier of the multi-tier EDN to the first power distribution node of the lower tier, wherein the first CCN is configured to include or be associated with a local power source that has the portion of the first power available for transfer to the second CCN.

8. The system of claim 1, wherein the multi-tier EDN comprises three tiers including the lower tier, the higher tier, and a top tier that is higher in the multi-tier EDN than the higher tier, wherein the at least one other node controller component further comprises a third node controller component, wherein the lower tier comprises the first node controller component and the first power distribution node, the higher tier comprises the second node controller component and the second power distribution node, and the top tier comprises the third node controller component and a third power distribution node that are respectively configured to be interfaced with each other, and wherein the third power distribution node comprises a power generation plant that generates at least a portion of the first power for distribution throughout at least a portion of the multi-tier EDN, including the higher tier and the lower tier.

9. The system of claim 8, wherein the first node controller component is further configured to identify an electrical device of a consumer entity, based at least in part on device identifier data detected from the electrical device by the first node controller component, in response to the electrical device being connected to an electrical outlet associated with a remote CCN of the set of CCNs to receive a portion of the first power from the first power distribution node, to enable billing of an account of the consumer entity, by the first node controller component, for another cost associated with the portion of the first power received by the electrical device, wherein the remote CCN is operated by an entity other than the consumer entity and a utility provider entity that operates the power sub-station.

10. The system of claim 1, wherein, in response to the determining the amount of the power collectively requested by the set of CCNs at the given time exceeds the defined amount of power that the first power distribution node is able to supply, the first node controller component is further configured to transmit a request to at least one CCN of the set of CCNs to request the at least one CCN to reduce power consumption in order to facilitate preventing the first power distribution node from being damaged.

11. The system of claim 1, further comprising a sensor component comprising one or more sensors that are configurable to be distributed at various locations throughout the multi-tier EDN, wherein at least a portion of the one or more sensors are located in the lower tier and are communicatively connected to the first node controller component to enable communication of at least a portion of the power-related data relating to power conditions associated with the lower tier to the first node controller component to enable the control of the distribution of the first power in the lower tier.

12. The system of claim 1, wherein the at least one defined control criterion comprises at least one of at least one defined communication channel selection criterion, at least one defined data selection criterion, or at least one defined power distribution criterion, wherein the at least one defined communication channel selection criterion relates to at least one of an amount of the data to be communicated, a type of the data to be communicated, a priority level of the data to be communicated, respective communication conditions of respective communication channels, respective costs of communication of the data for the respective communication channels, current availability of the respective communication channels, or time of day of communication of the data, wherein the at least one defined data selection criterion relates to at least one of a destination address of the subset of the data, a type of the data available for selection, an amount of the data specified to be receivable at the destination address, the priority of the data, respective hierarchy levels of the first node controller component and the at least one other node controller component, or communication conditions associated with the first communication channel to be used to communicate the subset of the data, and wherein the at least one defined power distribution criterion relates to at least one of improvement relating to net consumption of the first power at the lower tier of the multi-tier EDN, a reduction of an amount of second power to be transferred from the higher tier in the multi-tier EDN to the lower tier, a defined amount of power that is receivable by a power distribution source (PDS) at a given time, the defined amount of power that is distributable at a given time by the PDS, a defined upper limit on an operating temperature of the PDS, power distribution control information or a rule received from the higher tier in the multi-tier EDN, an amount of available local power from the local power distribution source in the lower tier, a predicted amount of power usage in the lower tier, or a consumer agreement relating to power distribution for the CCN of the set of CCNs in the lower tier.

13. A method, comprising:
controlling, by a system comprising a processor, distribution of power to a set of consumer consumption nodes (CCNs) in a level of a multi-level power distribution network (PDN), wherein the multi-level PDN comprises the level and at least one other level that is higher than the level in the hierarchy of the multi-level PDN;

determining, by the system, whether an amount of power collectively requested by the set of CCNs at a particular time exceeds a defined amount of power that the distribution transformer in the level is able to supply;

in response to determining the amount of the power collectively requested by the set of CCNs at the particular time exceeds the defined amount of power, apportioning, by the system, the power among respective CCNs of the set of CCNs to enable the defined amount of power not to be exceeded to facilitate the controlling of the distribution of the power in the level;

in response to identifying an interruption in supplying of second power to a distribution transformer located in the level by a power sub-station located in the at least one other level, determining, by the system, whether third power is available from a local power source associated with a CCN of the set of CCNs;

in response to determining the third power is available from the local power source associated with the CCN, allocating, by the system, the third power to at least one other CCN of the set of CCNs based at least in part on respective priority levels of the respective CCNs of the set of CCNs;

controlling, by the system, communication of data between a first network node controller component located in the level and at least one other network node controller component in the at least one other level to enable controlling the distribution of the power to the set of CCNs in the level, wherein the distribution of the power and the data communications are respectively controlled in accordance with at least one defined control criterion, and wherein the first network node controller component is associated with the distribution transformer in the level and the at least one other network node controller component is associated with the power sub-station in the at least one other level; and to enable the controlling of the communication of the data, determining, by the system, a first communication channel from a set of communication channels to use to communicate a subset of the data to the at least one other network node controller component, based at least in part on respective communication conditions of respective communication channels of the set of communication channels, a priority level associated with communication of the subset of the data to the at least one other node controller component to enable control of power distribution by the power sub-station, and the at least one defined control criterion relating to a communication channel determination for inter-level data communications, wherein the determining the first communication channel to use to communicate the subset of the data to the at least one other network node controller component further comprises:

determining that the communication of the subset of the data to the at least one other node controller component via the first communication channel has a higher cost than the communication of the subset of the data to the at least one other node controller component via a second communication channel of the set of communication channels, and determining that the subset of the data is to be communicated via the first communication channel instead of the second communication channel, notwithstanding the communication of the subset of the data via the first communication channel resulting in the higher cost, based at least in part on the priority level associated with the communication of the subset of the data being determined to satisfy a defined priority threshold level that indicates the higher cost is to be incurred, in accordance with the at least one defined control criterion.

14. The method of claim 13, further comprising:
monitoring, by the system, power conditions associated with the level of the multi-level PDN to enable the controlling of the distribution of the power; and
controlling, by the system, the distribution of the power to the set of CCNs in the level at least in part by transferring local power available from the local power source located in the level to at least one CCN of the set of CCNs to reduce an amount of power transferred from the at least one other level in the multi-level PDN to the level.

15. The method of claim 13, further comprising:
receiving, by the system, a set of the data, wherein the set of the data comprises at least one of power-related data relating to power conditions or communication-related data relating to the respective communication conditions, associated with the level;
filtering, by the system, the set of the data to enable generating the subset of the data that comprises a portion of the set of the data that is less than all of the power-related data or the communication-related data contained in the set of the data to enable the communicating of the subset of the data to the at least one other network node controller component, in accordance with the at least one defined control criterion relating to selection of data usable by the at least one other network node controller component to enable control of power distribution for the level and the at least one other level, wherein the at least one other network node controller component is located in at least one of a middle level of the hierarchy of the multi-level PDN or a top level of the hierarchy of the multi-level PDN; and
communicating, by the system, of the subset of the data to the at least one other network node controller component via the first communication channel.

16. The method of claim 13, further comprising:
monitoring, by the system, communication conditions associated with the first network node controller component;
identifying, by the system, one or more available communication channels of the set of communication channels associated with the first network node controller component at a specified time in connection with communication of a message, wherein the one or more available communication channels comprise at least one of a wireline communication channel or a wireless communication channel;
applying, by the system, at least one defined control rule to communication-related data relating to the one or more available communication channels, wherein the communication related data comprises information relating to the respective communication conditions of the one or more available communication channels;
determining, by the system, an available communication channel from the one or more available communication channels for use in communicating the message, in accordance with the application of the at least one defined control rule; and
transmitting, by the system, the message to at least one of the at least one other network node controller component or a CCN of the set of CCNs to enable the controlling of the communication of the data and the controlling of the distribution of the power to the set of CCNs in the level of the multi-level PDN.

17. The method of claim 13, further comprising:
monitoring, by the system, security-related conditions associated with at least one of the first network node controller component, the at least one other network node controller component, or at least one power distribution source, wherein the at least one power distribution source comprises the power sub-station or the distribution transformer;
detecting, by the system, a breach in security of at least one of the first network node controller component, the at least one other network node controller component, or the at least one power distribution source, based at least in part on information relating to the security-related conditions; and
performing, by the system, one or more security actions in response to the detecting of the breach in security.

18. The method of claim 17, wherein the performing the one or more security actions in response to the detecting of the breach in the security, further comprises:
isolating, by the system, the at least one of the first network node controller component, the at least one other network node controller component, or the at least one power distribution source from another component in the multi-level PDN to reduce a risk of a breach in security in the other component; and
routing, by the system, a portion of the power via an alternate power channel or a portion of the subset of the data via an alternate communication channel, wherein the routing of the portion of the power via the alternate power channel facilitates distributing of the portion of the power and the isolating of the at least one power distribution source.

19. A system, comprising:
means for controlling distribution of power to a set of consumer consumption nodes (CCNs) in a first tier of a multi-tier electrical distribution network (EDN) at the first tier, wherein the multi-tier EDN comprises the first tier and a second tier that is higher than the first tier in the hierarchy of the multi-tier EDN;
means for determining whether an amount of power requested by the set of CCNs at a given time exceeds a defined amount of power that the first power distribution node is able to supply, wherein the means for controlling the distribution of the power further comprises means for allocating respective amounts of power to respective CCNs of the set of CCNs to enable the defined amount of power to not be exceeded to enable the controlling of the distribution of the power in the first tier;
means for determining whether third power is available from a CCN of the set of CCNs in response to determining an interruption in supplying of second power to a distribution transformer located in the first tier by a power sub-station located in the second tier, wherein the means for controlling further comprises means for allocating the third power to at least one other CCN of the set of CCNs, based at least in part on respective priority levels of the respective CCNs of the set of CCNs, in response to determining the third power is available from the CCN;
means for controlling communication of the data between a first network node controller component located in the first tier and a second network node controller component located in the second tier in the multi-tier EDN to enable the controlling of the distribution of the power in the first tier, wherein the distribution of the power and the communication of the data are respectively controlled in accordance with at least one defined control criterion, and wherein the first network node controller component is associated with the distribution transformer located in the first tier and the second network node controller component is associated with the power substation located in the second tier; and
means for determining a first communication channel from a set of communication channels to use to communicate a subset of the data to the second network node controller component, based at least in part on respective communication conditions of respective communication channels of the set of communication channels, a priority level associated with communication of the subset of the data to the second node controller component to enable control of power distribution by the power sub-station, and the at least one defined control criterion relating to a communication channel determination for inter-tier data communications,
wherein a determination is made that first communicating the subset of the data to the second network node controller component via the first communication channel has a higher cost than second communicating the subset of the data to the second network node controller component via a second communication channel of the set of communication channels, and
wherein the means for determining the first communication channel comprises means for determining that the subset of the data is to be communicated to the second network node controller component via the first communication channel instead of the second communication channel, overriding that the first communicating of the subset of the data via the first communication channel results in the higher cost, based at least in part on the priority level associated with the first communicating the subset of the data being determined to satisfy a defined priority threshold level that indicates the higher cost is to be incurred.

20. The system of claim 19, further comprising:
means for sensing power conditions or communication conditions associated with the first tier of the multi-tier EDN to enable generating power-related data or communication-related data;
means for receiving a at least a portion of a set of the data from the means for sensing, wherein the set of the data comprises the power-related data relating to power conditions or the communication-related data relating to communication conditions, associated with the first tier;
means for determining the subset of the data from the set of the data, wherein the subset of the data comprises a first portion of the set of the data that is determined to satisfy a defined data selection criterion for data communication to the second network node controller component and excludes a second portion of the set of the data that is determined to not satisfy the defined data selection criterion to enable the communication of the subset of the data to the second network node controller component, in accordance with the at least one defined control criterion, to enable the control of the communication of the data and the control of the distribution of the first power to the set of CCNs in the first tier of the multi-tier EDN, wherein the second network node controller component is located in at least one of a middle tier of the hierarchy of the multi-tier EDN or a top tier of the hierarchy of the multi-tier EDN; and means for communicating the subset of the data to the second network node controller component via the first communication channel.

\* \* \* \* \*